United States Patent
Yonebayashi et al.

(10) Patent No.: US 10,272,954 B2
(45) Date of Patent: Apr. 30, 2019

(54) PANEL

(71) Applicant: NIPPON STEEL & SUMITOMO METAL CORPORATION, Tokyo (JP)

(72) Inventors: Toru Yonebayashi, Tokyo (JP); Yoshiaki Nakazawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 9 days.

(21) Appl. No.: 15/116,705

(22) PCT Filed: Mar. 13, 2015

(86) PCT No.: PCT/JP2015/057467
§ 371 (c)(1),
(2) Date: Aug. 4, 2016

(87) PCT Pub. No.: WO2015/137482
PCT Pub. Date: Sep. 17, 2015

(65) Prior Publication Data
US 2016/0347376 A1    Dec. 1, 2016

(30) Foreign Application Priority Data

Mar. 14, 2014  (JP) ................. 2014-052405

(51) Int. Cl.
*B62D 25/20* (2006.01)
*E04C 2/08* (2006.01)
*E04C 2/32* (2006.01)

(52) U.S. Cl.
CPC ............... *B62D 25/20* (2013.01); *E04C 2/08* (2013.01); *E04C 2/326* (2013.01); *B62D 25/2054* (2013.01)

(58) Field of Classification Search
CPC ..................................................... B62D 25/20
(Continued)

(56) References Cited

U.S. PATENT DOCUMENTS 7,036,860 B1 *  5/2006  McGuckin ............. B62D 43/10
                                                        296/193.07
2003/0034673 A1 *  2/2003  Sugihara ................ B62D 21/10
                                                        296/204
(Continued)

FOREIGN PATENT DOCUMENTS

CN          1743585 A      3/2006
CN          1847072 A      10/2006
(Continued)

OTHER PUBLICATIONS

International Search Report for PCT/JP2015/057467 dated May 26, 2015.
(Continued)

*Primary Examiner* — Jason S Morrow
(74) *Attorney, Agent, or Firm* — Birch, Stewart, Kolasch & Birch, LLP

(57) ABSTRACT

To provide a panel whose surface rigidity can be improved appropriately in accordance with a load. Provided is a panel including: a load point to which a load is applied from the outside; and a protrusion that protrudes from a surface of the panel and is formed continuously or discontinuously around the load point. The protrusion intersects, at a plurality of positions, each of a plurality of virtual straight lines extending radially from the load point.

4 Claims, 25 Drawing Sheets

(58) Field of Classification Search
USPC .................................. 296/187.08, 193.07
See application file for complete search history.

(56) References Cited

U.S. PATENT DOCUMENTS

| | | | | |
|---|---|---|---|---|
| 2008/0258502 A1* | 10/2008 | Egawa | ................... | B62D 25/20 |
| | | | | 296/193.07 |
| 2008/0258503 A1* | 10/2008 | Egawa | ............... | B62D 25/2072 |
| | | | | 296/193.07 |
| 2008/0258506 A1 | 10/2008 | Egawa et al. | | |
| 2010/0060040 A1 | 3/2010 | Yasuhara et al. | | |
| 2010/0066125 A1* | 3/2010 | Egawa | ............... | B62D 25/2036 |
| | | | | 296/193.07 |
| 2013/0015682 A1 | 1/2013 | Ikeda et al. | | |
| 2014/0311330 A1* | 10/2014 | Parida | ..................... | F41H 7/042 |
| | | | | 89/36.08 |
| 2015/0084376 A1* | 3/2015 | Shigihara | ............. | B62D 25/087 |
| | | | | 296/193.07 |
| 2017/0253277 A1* | 9/2017 | Eichelhard | ............. | B62D 25/20 |

FOREIGN PATENT DOCUMENTS

| | | |
|---|---|---|
| CN | 101289100 A | 10/2008 |
| CN | 101289101 A | 10/2008 |
| CN | 101636309 A | 1/2010 |
| CN | 102822040 A | 12/2012 |
| CN | 203245305 U | 10/2013 |
| JP | 2006-297966 A | 11/2006 |
| JP | 2008-265540 A | 11/2008 |
| JP | 2008-279797 A | 11/2008 |
| JP | 2009-286249 A | 12/2009 |
| JP | 2012-148290 A | 8/2012 |
| JP | 5218633 B2 | 6/2013 |
| JP | 2013-139216 A | 7/2013 |
| WO | WO 2011/118016 A1 | 9/2001 |

OTHER PUBLICATIONS

Written Opinion of the International Searching Authority for PCT/JP2015/057467 (PCT/ISA/237) dated May 26, 2015.
Chinese Office Action and Search Report, dated Aug. 8, 2017, for corresponding Chinese Application No. 201580012493.3, with a partial English translation of the Chinese Office Action.
Japanese Office Action, dated Oct. 3, 2017, for corresponding Japanese Application No. 2016-507842, with a partial English translation.
Korean Office Action, dated Aug. 22, 2017, for corresponding Korean Application No. 10-2016-7024298, with a partial English translation.
Japanese Office Action dated Jun. 6, 2017, issued in Japanese Patent Application 2016-507842 with partial English translation.
Korean Office Action for corresponding Korean Application No. 10-2016-7024298, dated Mar. 7, 2018, with a partial English translation.
Chinese Office Action and Search Report for corresponding Chinese Application No. 201580012493.3, dated May 2, 2018, with English translation.

* cited by examiner

PANEL

TECHNICAL FIELD

The present invention relates to a panel, particularly to a panel having a load point to which a load is applied from the outside.

BACKGROUND ART

In recent years, panels used for automobiles and the like are required to be reduced in weight. An example of a method for weight reduction is to reduce sheet thickness. A reduction in sheet thickness, however, causes a problem in that rigidity is lowered. Hence, to ensure rigidity without increasing sheet thickness, forming protrusions and recesses in a panel is proposed. The protrusions and recesses are required to be formed with a depth as small as possible in order to suppress interference with other components.

JP 5218633B discloses a panel having a plurality of protrusions and a plurality of recesses. Each protrusion has a flat top face. Each recess has a flat bottom face. The protrusions and the recesses are alternately arranged in rows and columns.

JP 2012-148290A discloses a sheet material having protrusions and recesses. In this sheet material, many imaginary squares are combined vertically and horizontally to form a sheet surface, and the sheet surface has a protrusion-and-recess pattern. A basic configuration, where first and second regions are formed in the imaginary square, and more than one of various basic configurations derived from the basic configuration are butted together at their peripheral edges such that the first regions are butted together and the second regions are butted together; thus, an entire configuration of the sheet surface is obtained. The sheet material is configured in a manner that the protrusion-and-recess pattern is formed over the entire sheet surface by upwardly raising the first regions and downwardly recessing the second regions.

JP 2009-286249A discloses a floor panel provided with a protrusion. In the protrusion, triangular flat surfaces are combined to have an angle. A flat surface is formed around the protrusion.

JP 2006-297966A discloses a floor structure of a vehicle body. This floor structure includes a floor panel. The floor panel is provided with beads. The beads have a concentric arc shape whose center is a portion where a side sill and a cross-member intersect each other.

CITATION LIST

Patent Literature

Patent Literature 1: JP 5218633B
Patent Literature 2: JP 2012-148290A
Patent Literature 3: JP 2009-286249A
Patent Literature 4: JP 2006-297966A

SUMMARY OF INVENTION

Technical Problem

The above panels include a panel on which a heavy object is placed, such as a floor panel of an automobile. Such a panel needs high surface rigidity. Here, surface rigidity indicates a degree to which a surface can withstand, without bending, a force pressing the surface. The present inventors studied the surface rigidity of the panels having protrusions and recesses described in the above cited literatures. The results revealed that none of the panels were adequate in improving surface rigidity. Specifically, since the protrusions and recesses formed in the panels described in the above cited literatures are not designed in consideration of a point to which a load is applied, improvement in surface rigidity is not adequate.

The present invention has been made in view of the above problem, and an object of the present invention is to provide a panel whose surface rigidity can be improved appropriately in accordance with a load.

Solution to Problem

According to an aspect of the present invention in order to achieve the above-mentioned object, there is provided a panel including: a load point to which a load is applied from the outside; and a protrusion that protrudes from a surface of the panel and is formed continuously or discontinuously around the load point. The protrusion intersects, at a plurality of positions, each of a plurality of virtual straight lines extending radially from the load point.

The load point may be a junction with another member.

The panel may include a plurality of the load points. At least one of density, a formation range, and a cross-sectional shape of the protrusion may differ in accordance with an assumed load applied to the load point.

At a boundary portion where the protrusions formed around the corresponding plurality of load points intersect each other, side faces of the protrusions may be continuous via a curved surface.

A ridge line of the protrusion may perpendicularly intersect the plurality of virtual straight lines.

The plurality of virtual straight lines may be straight lines connecting the load point and a plurality of vertices of the panel.

The protrusion may include a top face parallel to the surface of the panel.

The protrusion may include a plurality of ring-shaped protrusions formed concentrically. The center of the ring-shaped protrusion may coincide with the load point.

The protrusion may include a spiral-shaped protrusion whose base point is the load point.

The panel may be made of a steel sheet.

The panel may be a floor panel of an automobile.

Advantageous Effects of Invention

According to a panel of the present invention, surface rigidity can be improved appropriately in accordance with a load.

DESCRIPTION OF EMBODIMENTS

Hereinafter, (a) preferred embodiment(s) of the present invention will be described in detail with reference to the appended drawings. In this specification and the drawings, elements that have substantially the same function and structure are denoted with the same reference signs, and repeated explanation is omitted. Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

«1. First Embodiment»

Figure 1:
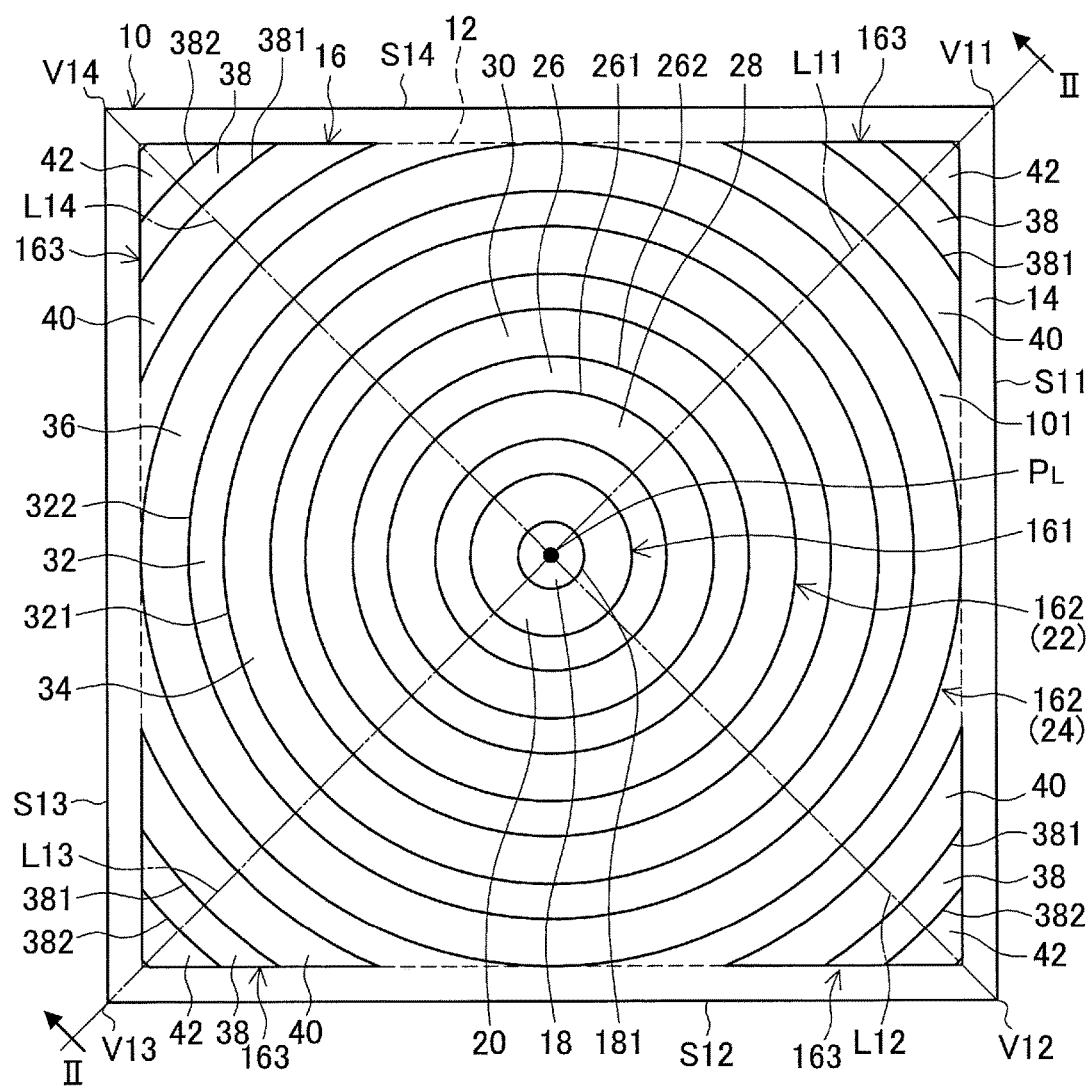
FIG. 1 is a plan view of a panel according to a first embodiment.
Figure 2:
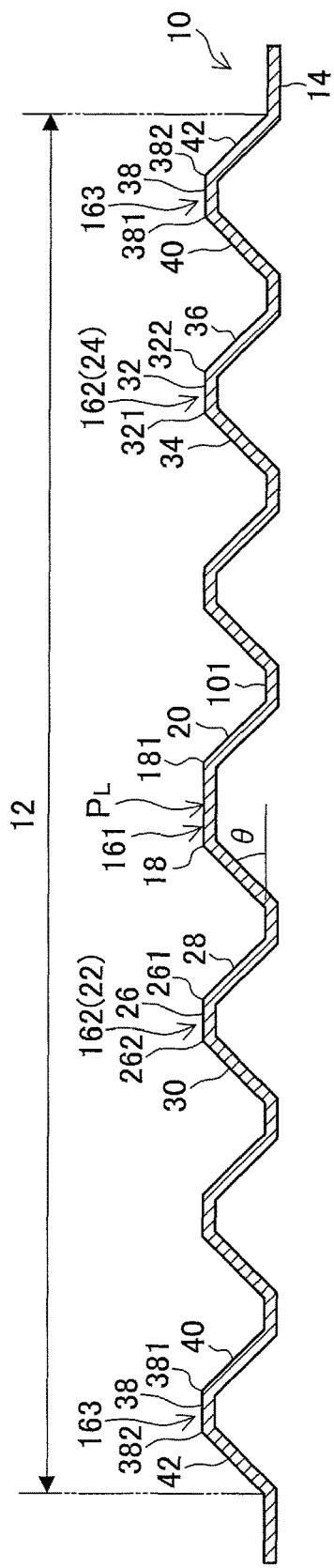
FIG. 2 is a II-II cross-sectional view of FIG. 1.

A panel 10 according to a first embodiment will be described with reference to FIGS. 1 and 2. FIG. 1 is a plan view of the panel 10. FIG. 2 is a II-II cross-sectional view of FIG. 1.

<1-1. Overall Configuration of Panel>

The panel 10 has a square shape in a planar view. In other words, the panel 10 has, in a planar view, four vertices V11, V12, V13, and V14 and four sides S11, S12, S13, and S14. The side S11 connects the vertex V11 and the vertex V12. The side S12 connects the vertex V12 and the vertex V13. The side S13 connects the vertex V13 and the vertex V14. The side S14 connects the vertex V14 and the vertex V11. This panel 10 includes a load point $P_L$, a reinforced section 12, and a peripheral edge 14.

The panel 10 is, for example, a support plate that supports a heavy object. Specific examples are a floor panel for an automobile, a trunk lid inner panel, a floor for a building material, a support plate used for a copying machine or a refrigerator, and a casing of an attache case. A material of the panel 10 may be, for example, a metal (e.g., steel, aluminum alloy, titanium, or stainless steel) or a synthetic resin. In the case where the panel 10 is made of a metal, the panel 10 is produced by press working, for example. Improving the formability of the panel 10 by heating, as in warm forming or hot stamping, facilitates forming by press working. In the case where the panel 10 is made of a synthetic resin, the panel 10 is produced by injection molding, for example.

The reinforced section 12 as a whole has, in a planar view, a square shape one size smaller than that of the panel 10. The peripheral edge 14 is formed around the reinforced section 12. The panel 10 is attached to another member at the peripheral edge 14. Specifically, for example, the panel 10 is attached to another member at positions of the peripheral edge 14 that correspond to the four corners of the panel 10.

The reinforced section 12 is provided with a plurality of protrusions 16 around the load point $P_L$. The plurality of protrusions 16 include a first protrusion 161, a plurality (two in the present embodiment) of second protrusions 162, and a plurality (four in the present embodiment) of third protrusions 163. Note that the numbers of the second protrusions 162 and the third protrusions 163 are set appropriately in consideration of at least surface rigidity against an assumed load applied to the load point $P_L$, as will be described later.

The planar shape of the panel 10 is not particularly limited, and may be any of various shapes. The planar shape of the panel 10 may be, instead of a square, a rectangle or a rectangle having one of its four corners cut off.

<1-2. Load Point>

The load point $P_L$ indicates a position where a load is applied to the panel 10 from the outside. In this specification, a load applied to the panel 10 means a load that is applied to the panel 10 from a direction intersecting a plane along which the panel 10 extends. Accordingly, the load point $P_L$ does not include a position where a load is applied to the panel 10 from a direction along the plane along which the panel 10 extends.

The load point $P_L$ is typically configured as a junction with another member. For example, in the case where the panel 10 is a floor panel of a vehicle, a joint position of a support member on which a seat in a cabin is placed may serve as the load point $P_L$. In such an example, the load point $P_L$ of the floor panel is provided with a tapped hole, and the support member is joined to the floor panel with a bolt, etc. Thus, in the floor panel, a load is applied to the load point $P_L$.

A method for joining another member to the load point $P_L$ of the panel 10 is not limited to the method using a bolt, etc., and may be joining by welding or joining by using an adhesive. Moreover, another member need not be joined to the load point $P_L$ of the panel 10. For example, the panel 10 and another member may come into contact at the load point $P_L$ to cause a load to be applied to the load point $P_L$.

<1-3. First Protrusion>

The first protrusion 161 protrudes from a surface 101 of the panel 10. The panel 10 has, at a position where the first protrusion 161 is formed, a recess opening toward the rear surface side. The recess has a shape corresponding to the first protrusion 161. The first protrusion 161 is formed concentrically with the load point $P_L$ of the panel 10 in a planar view. The first protrusion 161 includes a top face 18 and a side face 20.

The top face 18 has a circular shape in a planar view. As viewed from the thickness direction of the panel 10, the center of the top face 18 coincides with the load point $P_L$. The top face 18 is away from the surface 101 in the thickness direction of the panel 10. The top face 18 is parallel to the surface 101. The protrusion height of the first protrusion 161, i.e., the distance between the top face 18 and the surface 101 in the thickness direction of the panel 10, is 0.5 to 50 mm, for example. The protrusion height of the first protrusion 161 is set appropriately in consideration of at least surface rigidity against an assumed load applied to the load point $P_L$, as will be described later.

The side face 20 has a circular ring shape in a planar view. The inner circumferential edge of the side face 20 is farther from the surface 101 than the outer circumferential edge of the side face 20 is. The inner circumferential edge of the side face 20 is connected to the edge of the top face 18. The outer circumferential edge of the side face 20 is connected to the surface 101. Surface rigidity increases as an inclination angle θ of the side face 20 with respect to the surface 101 becomes larger. However, local sheet thickness reduction or cracking becomes more likely to occur during forming as the inclination angle θ of the side face 20 with respect to the surface 101 becomes larger. The inclination angle θ is set appropriately in consideration of at least surface rigidity against an assumed load applied to the load point $P_L$, as will be described later. On that occasion, ease of forming of a material may also be taken into consideration. In the case of a steel material, the inclination angle θ is preferably 15 to 60 degrees, further preferably 45 degrees.

A ridge line 181 formed as the boundary between the top face 18 and the side face 20 has a circular shape in a planar view. As illustrated in FIG. 1, the ridge line 181 intersects four virtual straight lines L11, L12, L13, and L14 perpendicularly. The virtual straight line L11 connects the load point $P_L$ and the vertex V11 in a planar view. The virtual straight line L12 connects the load point $P_L$ and the vertex V12 in a planar view. The virtual straight line L13 connects the load point $P_L$ and the vertex V13 in a planar view. The virtual straight line L14 connects the load point $P_L$ and the vertex V14 in a planar view. In other words, the four virtual straight lines L11, L12, L13, and L14 extend radially from the load point $P_L$. Although not shown, the ridge line 181 perpendicularly intersects all of the virtual straight lines extending radially from the load point $P_L$.

<1-4. Second Protrusion>

The two second protrusions 162 each protrude from the surface 101. The two second protrusions 162 each have a circular ring shape in a planar view. The two second protrusions 162 are formed concentrically with respect to the load point $P_L$. The panel 10 has, at a position where the second protrusion 162 is formed, a recess opening toward the rear surface side. The recess has a shape corresponding to the second protrusion 162. Hereinafter, one of the two second protrusions 162 that is closer to the load point $P_L$ will be called a first ring-shaped protrusion 22, and one of the two second protrusions 162 that is farther from the load point $P_L$ will be called a second ring-shaped protrusion 24.

<1-4-1. First Ring-Shaped Protrusion>

The first ring-shaped protrusion 22 includes a top face 26, a side face 28, and a side face 30. The top face 26 has a circular ring shape in a planar view. The inner diameter of the top face 26 is larger than the diameter of the top face 18. As viewed from the thickness direction of the panel 10, the center of the top face 26 coincides with the load point $P_L$. The top face 26 is away from the surface 101 in the thickness direction of the panel 10. The top face 26 is parallel to the surface 101. The protrusion height of the first ring-shaped protrusion 22, i.e., the distance between the top face 26 and the surface 101 in the thickness direction of the panel 10, is 0.5 to 50 mm, for example. The protrusion height of the first ring-shaped protrusion 22 may be the same as or different from the protrusion height of the first protrusion 161. The protrusion height of the first ring-shaped protrusion 22 is set appropriately in consideration of at least surface rigidity against an assumed load applied to the load point $P_L$, as will be described later.

The side face 28 is located closer to the load point $P_L$ than the top face 26 is. The side face 28 has a circular ring shape in a planar view. The outer circumferential edge of the side face 28 is farther from the surface 101 than the inner circumferential edge of the side face 28 is. The inner circumferential edge of the side face 28 is connected to the surface 101. The outer circumferential edge of the side face 28 is connected to the inner circumferential edge of the top face 26. An inclination angle θ of the side face 28 with respect to the surface 101 is set similarly to the inclination angle θ of the side face 20. The inclination angle θ of the side face 28 with respect to the surface 101 may be the same as or different from the inclination angle θ of the side face 20. The inclination angle θ of the side face 28 with respect to the surface 101 is set appropriately in consideration of at least surface rigidity against an assumed load applied to the load point $P_L$, as will be described later. On that occasion, the distance from the load point $P_L$ and ease of forming of a material may also be taken into consideration.

A ridge line 261 formed as the boundary between the top face 26 and the side face 28 has a circular shape in a planar view. The ridge line 261 has a larger diameter than the ridge line 181. As illustrated in FIG. 1, the ridge line 261 intersects the four virtual straight lines L11, L12, L13, and L14 perpendicularly. Although not shown, the ridge line 261 perpendicularly intersects all of the virtual straight lines extending radially from the load point $P_L$.

The side face 30 is farther from the load point $P_L$ than the top face 26 is. The side face 30 has a circular ring shape in a planar view. The inner circumferential edge of the side face 30 is farther from the surface 101 than the outer circumferential edge of the side face 30 is. The inner circumferential edge of the side face 30 is connected to the outer circumferential edge of the top face 26. The outer circumferential edge of the side face 30 is connected to the surface 101. An inclination angle θ of the side face 30 with respect to the surface 101 is set similarly to the inclination angle θ of the side face 20. The inclination angle θ of the side face 30 with respect to the surface 101 may be the same as or different from the inclination angles θ of the side face 20 and the side face 28. The inclination angle θ of the side face 30 with respect to the surface 101 is set appropriately in consideration of at least surface rigidity against an assumed load applied to the load point $P_L$, as will be described later. On that occasion, the distance from the load point $P_L$ and ease of forming of a material may also be taken into consideration.

A ridge line 262 formed as the boundary between the top face 26 and the side face 30 has a circular shape in a planar view. The ridge line 262 has a larger diameter than the ridge line 261. As illustrated in FIG. 1, the ridge line 262 intersects the four virtual straight lines L11, L12, L13, and L14 perpendicularly. The distance between the ridge line 262 and the ridge line 261, i.e., the width of the top face 26, is 0.5 to 50 mm, for example. Although not shown, the ridge line 262 perpendicularly intersects all of the virtual straight lines extending radially from the load point $P_L$.

<1-4-2. Second Ring-Shaped Protrusion>

The second ring-shaped protrusion 24 includes a top face 32, a side face 34, and a side face 36. The top face 32 has a circular ring shape in a planar view. As viewed from the thickness direction of the panel 10, the center of the top face 32 coincides with the load point $P_L$. The top face 32 is away from the surface 101 in the thickness direction of the panel 10. The top face 32 is parallel to the surface 101. The protrusion height of the second ring-shaped protrusion 24, i.e., the distance between the top face 32 and the surface 101 in the thickness direction of the panel 10, is 0.5 to 50 mm, for example. The protrusion height of the second ring-shaped protrusion 24 may be the same as or different from the protrusion heights of the first protrusion 161 and the first ring-shaped protrusion 22. The protrusion height of the second ring-shaped protrusion 24 is set appropriately in consideration of at least surface rigidity against an assumed load applied to the load point $P_L$, as will be described later.

The side face 34 is located closer to the load point $P_L$ than the top face 32 is. The side face 34 has a circular ring shape in a planar view. The outer circumferential edge of the side face 34 is farther from the surface 101 than the inner circumferential edge of the side face 34 is. The inner circumferential edge of the side face 34 is connected to the surface 101. The outer circumferential edge of the side face 34 is connected to the inner circumferential edge of the top face 32. An inclination angle θ of the side face 34 with respect to the surface 101 is set similarly to the inclination angle θ of the side face 20. The inclination angle θ of the side face 34 with respect to the surface 101 may be the same as or different from the inclination angles θ of the side face 20, the side face 28, and the side face 30. The inclination angle θ of the side face 34 with respect to the surface 101 is set appropriately in consideration of at least surface rigidity against an assumed load applied to the load point $P_L$, as will be described later. On that occasion, the distance from the load point $P_L$ and ease of forming of a material may also be taken into consideration.

A ridge line 321 formed as the boundary between the top face 32 and the side face 34 has a circular shape in a planar view. The ridge line 321 has a larger diameter than the ridge line 262. As illustrated in FIG. 1, the ridge line 321 intersects the four virtual straight lines L11, L12, L13, and L14 perpendicularly. Although not shown, the ridge line 321 perpendicularly intersects all of the virtual straight lines extending radially from the load point $P_L$.

The side face 36 is farther from the load point $P_L$ than the top face 32 is. The side face 36 has a circular ring shape in a planar view. The inner circumferential edge of the side face 36 is farther from the surface 101 than the outer circumferential edge of the side face 36 is. The inner circumferential edge of the side face 36 is connected to the outer circumferential edge of the top face 32. The outer circumferential edge of the side face 36 is connected to the surface 101. An inclination angle θ of the side face 36 with respect to the surface 101 is set similarly to the inclination angle θ of the side face 20. The inclination angle θ of the side face 36 with respect to the surface 101 may be the same as or different from the inclination angles θ of the side face 20, the side face 28, the side face 30, and the side face 34. The inclination angle θ of the side face 36 with respect to the surface 101 is set appropriately in consideration of at least surface rigidity against an assumed load applied to the load point $P_L$, as will be described later. On that occasion, the distance from the load point $P_L$ and ease of forming of a material may also be taken into consideration.

A ridge line 322 formed as the boundary between the top face 32 and the side face 36 has a circular shape in a planar view. The ridge line 322 has a larger diameter than the ridge line 321. As illustrated in FIG. 1, the ridge line 322 intersects the four virtual straight lines L11, L12, L13, and L14 perpendicularly. Although not shown, the ridge line 322 perpendicularly intersects all of the virtual straight lines extending radially from the load point $P_L$.

The distance between the ridge line 322 and the ridge line 321, i.e., the width of the top face 32, is 1 to 50 mm, for example. The width of the top face 32 may be the same as or different from the width of the top face 26.

<1-5. Third Protrusion>

The four third protrusions 163 each protrude from the surface 101. The four third protrusions 163 each have a substantially triangular shape in a planar view. The four third protrusions 163 are located at the four corners of the reinforced section 12. The four third protrusions 163 are located on a circle whose center is the load point $P_L$. The panel 10 has, at a position where the third protrusion 163 is formed, a recess opening toward the rear surface side. The recess has a shape corresponding to the third protrusion 163. The four third protrusions 163 each include a top face 38, a side face 40, and a side face 42.

The top face 38 has a substantially trapezoidal shape in a planar view. The top face 32 is away from the surface 101 in the thickness direction of the panel 10. The top face 38 is parallel to the surface 101. The protrusion height of the third protrusion 163, i.e., the distance between the top face 38 and the surface 101 in the thickness direction of the panel 10, is 0.5 to 50 mm, for example. The protrusion height of the third protrusion 163 may be the same as or different from the protrusion heights of the first protrusion 161, the first ring-shaped protrusion 22, and the second ring-shaped protrusion 24. The protrusion height of the third protrusion 163 is set appropriately in consideration of at least surface rigidity against an assumed load applied to the load point $P_L$, as will be described later.

The side face 40 is located closer to the load point $P_L$ than the top face 38 is. The side face 40 has a substantially trapezoidal shape in a planar view. The lower end edge of the side face 40 is connected to the surface 101. The upper end edge of the side face 40 is connected to the top face 38. An inclination angle θ of the side face 40 with respect to the surface 101 is set similarly to the inclination angles θ of the side face 20, the side face 28, the side face 30, the side face 34, and the side face 36. The inclination angle θ of the side face 40 with respect to the surface 101 may be the same as or different from the inclination angles θ of the side face 20, the side face 28, the side face 30, the side face 34, and the side face 36. The inclination angle θ of the side face 40 with respect to the surface 101 is set appropriately in consideration of at least surface rigidity against an assumed load applied to the load point $P_L$, as will be described later. On that occasion, the distance from the load point $P_L$ and ease of forming of a material may also be taken into consideration.

The side face 42 is farther from the load point $P_L$ than the top face 38 is. The side face 42 has a substantially trapezoidal shape in a planar view. The lower end edge of the side face 42 is connected to the surface 101. The upper end edge of the side face 42 is connected to the top face 38. An inclination angle θ of the side face 42 with respect to the surface 101 is set similarly to the inclination angles θ of the side face 20, the side face 28, the side face 30, the side face 34, the side face 36, and the side face 40. The inclination angle θ of the side face 42 with respect to the surface 101 may be the same as or different from the inclination angles θ of the side face 20, the side face 28, the side face 30, the side face 34, the side face 36, and the side face 40. The inclination angle θ of the side face 42 with respect to the surface 101 is set appropriately in consideration of at least surface rigidity against an assumed load applied to the load point $P_L$, as will be described later. On that occasion, the distance from the load point $P_L$ and ease of forming of a material may also be taken into consideration.

At each of the third protrusions 163, a ridge line 381 formed as the boundary between the top face 38 and the side face 40 intersects one of the four virtual straight lines L11, L12, L13, and L14 perpendicularly. In addition, at each of the third protrusions 163, a ridge line 382 formed as the boundary between the top face 38 and the side face 42 intersects one of the four virtual straight lines L11, L12, L13, and L14 perpendicularly.

The distance between the ridge line 382 and the ridge line 381, i.e., the width of the top face 38, is 1 to 50 mm, for example. The width of the top face 38 may be the same as or different from the widths of the top face 26 and the top face 32.

<1-6. Modes of Plurality of Protrusions>

In the panel 10 according to the present embodiment, modes of the first protrusion 161, the second protrusions 162, and the third protrusions 163 are set in consideration of surface rigidity against an assumed load applied to the load point $P_L$.

For example, the heights of the first protrusion 161, the second protrusions 162, and the third protrusions 163 may be made larger for larger assumed loads. Moreover, the inclination angles θ of the side faces 20, 28, 30, 34, 36, 40, and 42 forming the first protrusion 161, the second protrusions 162, and the third protrusions 163 can be made larger for larger assumed loads. The heights of the first protrusion 161, the second protrusions 162, and the third protrusions 163 and the inclination angles θ of the side faces 20, 28, 30, 34, 36, 40, and 42 are elements of the cross-sectional shapes of the first protrusion 161, the second protrusions 162, and the third protrusions 163. Such elements of the cross-sectional shapes may have an influence on the magnitude of the surface rigidity of each of the first protrusion 161, the second protrusions 162, and the third protrusions 163.

Larger heights of the first protrusion 161, the second protrusions 162, and the third protrusions 163 and larger inclination angles θ of the side faces 20, 28, 30, 34, 36, 40, and 42 result in difficulty in forming of a material. In particular, in the case where a sheet material made of a steel material is subjected to press forming, sheet thickness tends to be reduced, and cracking is likely to occur in the sheet material. In the panel 10, the heights of the first protrusion 161, the second protrusions 162, and the third protrusions 163 and the inclination angles θ of the side faces 20, 28, 30, 34, 36, 40, and 42 are set in accordance with the magnitude of the assumed load. Thus, the panel 10 provided with appropriate surface rigidity in accordance with the assumed load can be produced with high yield.

In addition, the widths of the top faces 18, 26, 32, and 38 and the intervals between the first protrusion 161, the second protrusions 162, and the third protrusions 163 may be made smaller for larger assumed loads. The widths of the top faces 18, 26, 32, and 38 and the intervals between the first protrusion 161, the second protrusions 162, and the third protrusions 163 have an influence on the density of the protrusions 16 of the panel 10. The density of the protrusions 16 may have an influence on the magnitude of the surface rigidity of each region of the panel 10.

Smaller widths of the top faces 18, 26, 32, and 38 and smaller intervals between the first protrusion 161, the second protrusions 162, and the third protrusions 163 result in difficulty in forming of a material. In particular, in the case where a sheet material made of a steel material is subjected to press forming, sheet thickness tends to be reduced, and cracking is likely to occur in the sheet material. In the panel 10, the widths of the top faces 18, 26, 32, and 38 and the intervals between the first protrusion 161, the second protrusions 162, and the third protrusions 163 are set in accordance with the magnitude of the assumed load. Thus, the panel 10 provided with appropriate surface rigidity in accordance with the assumed load can be produced with high yield.

The heights of the first protrusion 161, the second protrusions 162, and the third protrusions 163 may all be the same, or some or all may be different. The inclination angles θ of the side faces 20, 28, 30, 34, 36, 40, and 42 forming the first protrusion 161, the second protrusions 162, and the third protrusions 163 may all be the same, or some or all may be different. Also the widths of the top faces 18, 26, 32, and 38 may all be the same, or some or all may be different. Also the intervals between the first protrusion 161, the second protrusions 162, and the third protrusions 163 may all be the same, or some or all may be different.

The presence or absence of the third protrusions 163 and the number of the second protrusions 162 may also be set in accordance with the magnitude of the assumed load. The presence or absence of the third protrusions 163 and the number of the second protrusions 162 have an influence on a formation range of the protrusions 16. The formation range of the protrusions 16 may have an influence on the magnitude of the surface rigidity of the entire panel 10. Changing the formation range of the protrusions 16 also allows the panel 10 to have appropriate surface rigidity in accordance with the assumed load.

<1-7. Effect of First Embodiment>

In the above-described panel 10 according to the present embodiment, the ridge lines 181, 261, 262, 321, 322, 381, and 382 intersect, at a plurality of positions, the virtual straight lines L11, L12, L13, and L14 extending radially from the load point $P_L$. This increases the moment of inertia of area of a cross section taken along each of the virtual straight lines L11, L12, L13, and L14. This results in an improvement in the surface rigidity of the panel 10. In particular, since the plurality of protrusions 16 forming the ridge lines 181, 261, 262, 321, 322, 381, and 382 are formed around the load point $P_L$ serving as the center, the anisotropy of the moment of inertia of area with respect to a load can be reduced. This provides appropriate surface rigidity against the load that the panel 10 may receive.

In the panel 10, the first ring-shaped protrusion 22, the second ring-shaped protrusion 24, and the third protrusion 163 have the top faces 26, 32, and 38, respectively. This increases the number of ridge lines that intersect the virtual straight lines extending radially from the load point $P_L$. As a result, the moment of inertia of area is further increased, making it easy to provide appropriate surface rigidity against the load that the panel 10 may receive.

In the panel 10, the ridge lines 181, 261, 262, 321, 322, 381, and 382 perpendicularly intersect the virtual straight lines L11, L12, L13, and L14 connecting the load point $P_L$ and the vertices V11, V12, V13, and V14 of the panel 10, out of the virtual straight lines extending radially from the load point $P_L$. This increases the number of ridge lines that intersect the virtual straight lines L11, L12, L13, and L14 between the load point $P_L$ and the vertices V11, V12, V13, and V14. This results in a further increase in the moment of inertia of area of a cross section taken along each of the virtual straight lines L11, L12, L13, and L14.

The shapes of the protrusions 16 in the panel 10 according to the present embodiment, specifically, the shapes of the ridge lines 181, 261, 262, 321, 322, 381, and 382 in a planar view, are not limited to circular shapes. Modifications of protrusions are described below in second to ninth embodiments.

«2. Second Embodiment»

Figure 3:
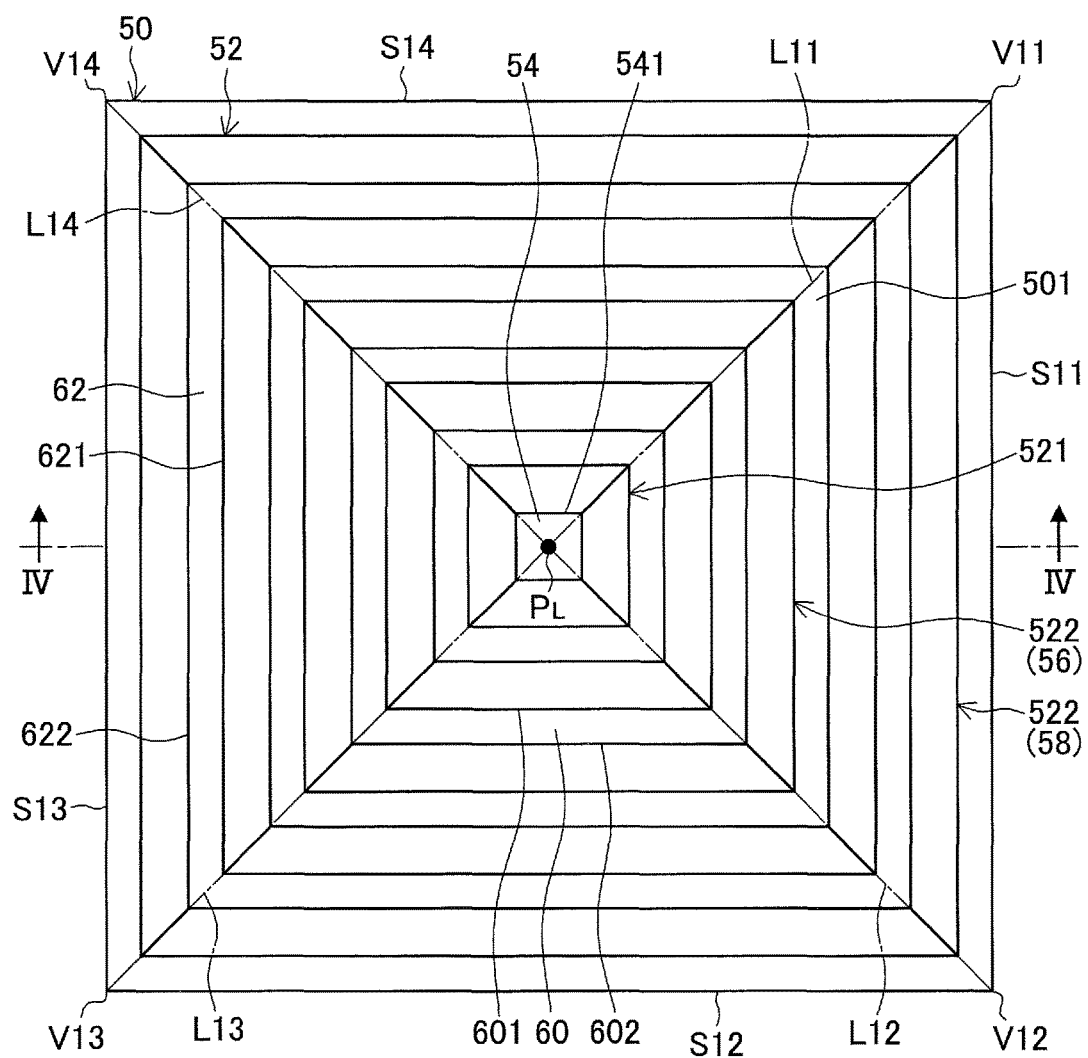
FIG. 3 is a plan view of a panel according to a second embodiment.
Figure 4:
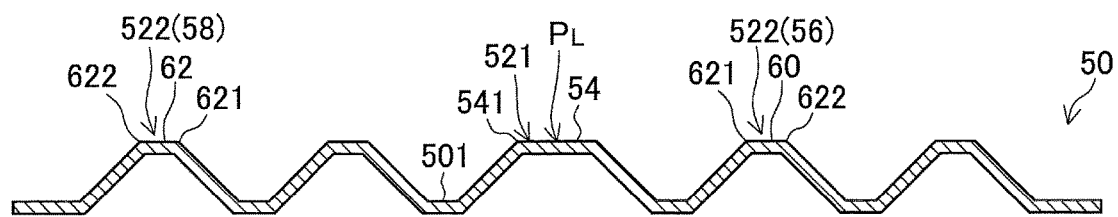
FIG. 4 is a IV-IV cross-sectional view of FIG. 3.

A panel 50 according to a second embodiment will be described with reference to FIGS. 3 and 4. FIG. 3 is a plan view of the panel 50. FIG. 4 is a IV-IV cross-sectional view of FIG. 3. The panel 50 according to the second embodiment differs from the panel 10 of the first embodiment in a configuration of a plurality of protrusions 52. The configuration of the protrusions 52 is mainly described below; description is given on differences from the protrusions 16 of the first embodiment.

The protrusions 52 include a first protrusion 521 and a plurality (two in the present embodiment) of second protrusions 522. As in the panel 10 of the first embodiment, the number of the second protrusions 522 is set appropriately in consideration of at least surface rigidity against an assumed load applied to the load point $P_L$.

<2-1. First Protrusion>

The first protrusion 521 protrudes from a surface 501 of the panel 50. The first protrusion 521 is formed concentrically with the load point $P_L$ of the panel 50 in a planar view. The first protrusion 521 includes a top face 54. The top face 54 has a square shape in a planar view. As viewed from the thickness direction of the panel 50, the center of the top face 54 coincides with the load point $P_L$.

The first protrusion 521 includes a ridge line 541. The ridge line 541 has a square shape in a planar view. As illustrated in FIG. 3, the ridge line 541 intersects the four virtual straight lines L11, L12, L13, and L14. Although not shown, the ridge line 541 intersects all of the virtual straight lines extending radially from the load point $P_L$ at angles within a range of 45 to 90 degrees. In other words, acute angles out of angles formed by the ridge line 541 and the virtual straight lines extending radially from the load point $P_L$ are within a range of 45 to less than 90 degrees.

<2-2. Second Protrusion>

The two second protrusions 522 each protrude from the surface 501. The two second protrusions 522 each have a square frame shape in a planar view. The two second protrusions 522 are formed concentrically with respect to the load point $P_L$. Hereinafter, one of the two second protrusions 522 that is closer to the load point $P_L$ will be called a first ring-shaped protrusion 56, and one of the two second protrusions 522 that is farther from the load point $P_L$ will be called a second ring-shaped protrusion 58.

<2-2-1. First Ring-Shaped Protrusion>

The first ring-shaped protrusion 56 includes a top face 60. The top face 60 has a square frame shape in a planar view. The first ring-shaped protrusion 56 includes a ridge line 601 and a ridge line 602. The ridge line 601 is located closer to the load point $P_L$ than the ridge line 602 is. The ridge line 601 and the ridge line 602 each have a square shape in a planar view. As illustrated in FIG. 3, the ridge line 601 and the ridge line 602 intersect the four virtual straight lines L11, L12, L13, and L14. Although not shown, the ridge line 601 and the ridge line 602 intersect all of the virtual straight lines extending radially from the load point $P_L$ at angles within a range of 45 to 90 degrees. In other words, acute angles out of angles formed by the ridge line 601 and the virtual straight lines extending radially from the load point $P_L$ are within a range of 45 to less than 90 degrees, and acute angles out of angles formed by the ridge line 602 and the virtual straight lines extending radially from the load point $P_L$ are within a range of 45 to less than 90 degrees.

<2-2-2. Second Ring-Shaped Protrusion>

The second ring-shaped protrusion 58 includes a top face 62. The top face 62 has a square frame shape in a planar view. The second ring-shaped protrusion 58 includes a ridge line 621 and a ridge line 622. The ridge line 621 is located closer to the load point $P_L$ than the ridge line 622 is. The ridge line 621 and the ridge line 622 each have a square shape in a planar view. As illustrated in FIG. 3, the ridge line 621 and the ridge line 622 intersect the four virtual straight lines L11, L12, L13, and L14. Although not shown, the ridge line 621 and the ridge line 622 intersect all of the virtual straight lines extending radially from the load point $P_L$ at angles within a range of 45 to 90 degrees. In other words, acute angles out of angles formed by the ridge line 621 and the virtual straight lines extending radially from the load point $P_L$ are within a range of 45 to less than 90 degrees, and acute angles out of angles formed by the ridge line 622 and the virtual straight lines extending radially from the load point $P_L$ are within a range of 45 to less than 90 degrees.

<2-3. Modes of Plurality of Protrusions>

In the panel 50 according to the present embodiment, modes of the first protrusion 521 and the second protrusions 522 are set in consideration of surface rigidity against an assumed load applied to the load point $P_L$. That is, as in the panel 10 according to the first embodiment, the heights of the first protrusion 521 and the second protrusions 522 and the inclination angles θ of the side faces forming the first protrusion 521 and the second protrusions 522 can be set in accordance with the magnitude of the assumed load. In addition, as in the panel 10 according to the first embodiment, the widths of the top faces 54, 60, and 62 and the intervals between the first protrusion 521 and the second protrusions 522 can be set in accordance with the magnitude of the assumed load. Thus, the panel 50 provided with appropriate surface rigidity in accordance with the assumed load can be produced with high yield.

The heights of the first protrusion 521 and the second protrusions 522 may all be the same, or some or all may be different. The inclination angles θ of the side faces forming the first protrusion 521 and the second protrusions 522 may all be the same, or some or all may be different. Also the widths of the top faces 54, 60, and 62 may all be the same, or some or all may be different. Also the intervals between the first protrusion 521 and the second protrusions 522 may all be the same, or some or all may be different. The number of the second protrusions 522 can also be set in accordance with the magnitude of the assumed load.

The panel 50 according to the second embodiment described above provides an effect similar to that of the panel 10 of the first embodiment.

«3. Third Embodiment»

Figure 5:
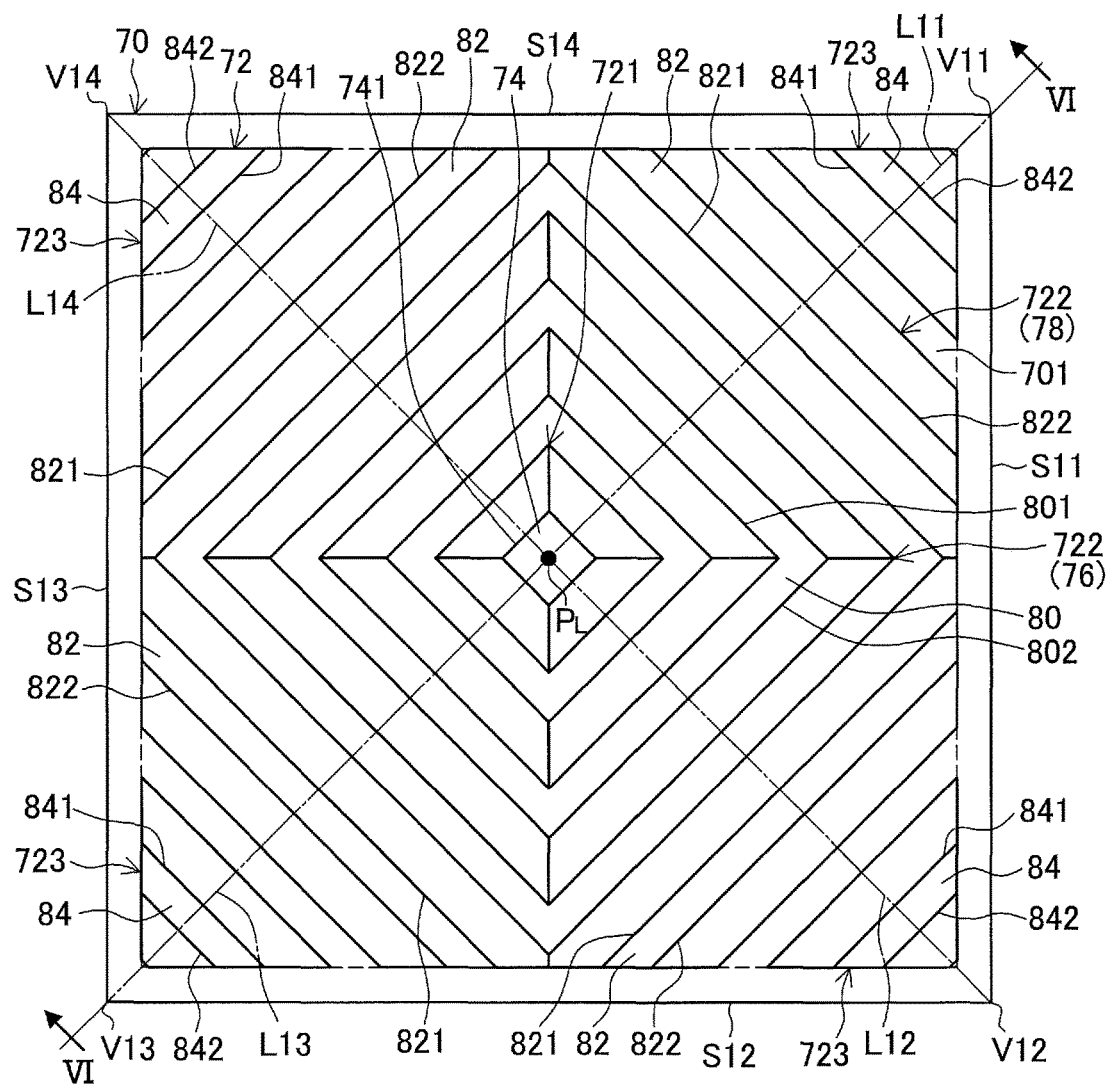
FIG. 5 is a plan view of a panel according to a third embodiment.
Figure 6:
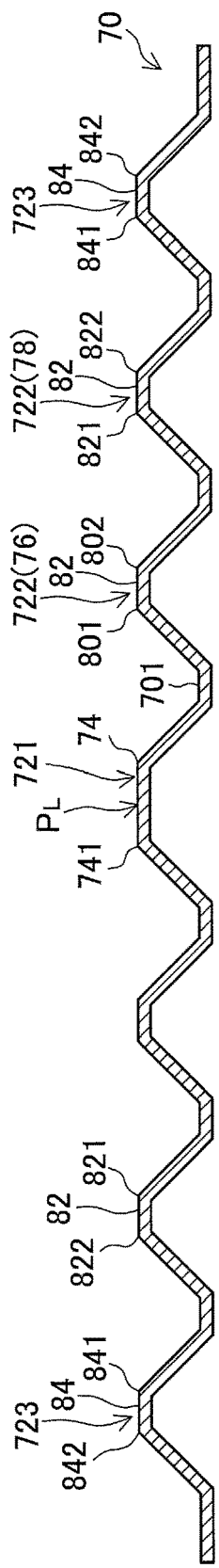
FIG. 6 is a VI-VI cross-sectional view of FIG. 5.

A panel 70 according to a third embodiment will be described with reference to FIGS. 5 and 6. FIG. 5 is a plan view of the panel 70. FIG. 6 is a VI-VI cross-sectional view of FIG. 5. The panel 70 according to the third embodiment differs from the panel 10 of the first embodiment in a configuration of a plurality of protrusions 72. The configuration of the protrusions 72 is mainly described below; description is given on differences from the protrusions 16 of the first embodiment.

The protrusions 72 include a first protrusion 721, a plurality (two in the present embodiment) of second protrusions 722, and a plurality (four in the present embodiment) of third protrusions 723. Note that the numbers of the second protrusions 722 and the third protrusions 723 are set appropriately in consideration of at least surface rigidity against an assumed load applied to the load point $P_L$, as in the panel 10 of the first embodiment.

<3-1. First Protrusion>

The first protrusion 721 protrudes from a surface 701 of the panel 70. The first protrusion 721 is formed concentrically with the load point $P_L$ of the panel 70 in a planar view. The first protrusion 721 includes a top face 74. The top face 74 has a square shape in a planar view. As viewed from the thickness direction of the panel 70, the center of the top face 74 coincides with the load point $P_L$.

The first protrusion 721 includes a ridge line 741. The ridge line 741 has a square shape in a planar view. As illustrated in FIG. 5, the ridge line 741 intersects the four virtual straight lines L11, L12, L13, and L14 perpendicularly. Although not shown, the ridge line 741 intersects all of the virtual straight lines extending radially from the load point $P_L$ at angles within a range of 45 to 90 degrees. In other words, acute angles out of angles formed by the ridge line 741 and the virtual straight lines extending radially from the load point $P_L$ are within a range of 45 to less than 90 degrees.

<3-2. Second Protrusion>

The two second protrusions 722 each protrude from the surface 701. The two second protrusions 722 each have a square frame shape in a planar view. The two second protrusions 722 are formed concentrically with respect to the load point $P_L$. Hereinafter, one of the two second protrusions 722 that is closer to the load point $P_L$ will be called a first ring-shaped protrusion 76, and one of the two second protrusions 722 that is farther from the load point $P_L$ will be called a second ring-shaped protrusion 78.

<3-2-1. First Ring-Shaped Protrusion>

The first ring-shaped protrusion 76 includes a top face 80. The top face 80 has a square frame shape in a planar view. The first ring-shaped protrusion 76 includes a ridge line 801 and a ridge line 802. The ridge line 801 is located closer to the load point $P_L$ than the ridge line 802 is. The ridge line 801 and the ridge line 802 each have a square shape in a planar view. As illustrated in FIG. 5, the ridge line 801 and the ridge line 802 intersect the four virtual straight lines L11, L12, L13, and L14 perpendicularly. Although not shown, the ridge line 801 and the ridge line 802 intersect all of the virtual straight lines extending radially from the load point $P_L$ at angles within a range of 45 to 90 degrees. In other words, acute angles out of angles formed by the ridge line 801 and the virtual straight lines extending radially from the load point $P_L$ are within a range of 45 to less than 90 degrees, and acute angles out of angles formed by the ridge line 802 and the virtual straight lines extending radially from the load point $P_L$ are within a range of 45 to less than 90 degrees.

<3-2-2. Second Ring-Shaped Protrusion>

In the present embodiment, the second ring-shaped protrusion 78 includes a plurality (four in the present embodiment) of top faces 82. The top face 82 has a trapezoidal shape in a planar view. The second ring-shaped protrusion 78 includes four ridge lines 821 and four ridge lines 822. The ridge lines 821 are located closer to the load point $P_L$ than the ridge lines 822 are. As illustrated in FIG. 5, the ridge lines 821 and the ridge lines 822 intersect the four virtual straight lines L11, L12, L13, and L14 perpendicularly. Although not shown, the ridge lines 821 and the ridge lines 822 intersect all of the virtual straight lines extending radially from the load point $P_L$ at angles within a range of 45 to 90 degrees. In other words, acute angles out of angles formed by the ridge lines 821 and the virtual straight lines extending radially from the load point $P_L$ are within a range of 45 to less than 90 degrees, and acute angles out of angles formed by the ridge lines 822 and the virtual straight lines extending radially from the load point $P_L$ are within a range of 45 to less than 90 degrees.

<3-3. Third Protrusion>

The four third protrusions 723 each protrude from the surface 701. The four third protrusions 723 each have a substantially triangular shape in a planar view. The four third protrusions 723 are located around the load point $P_L$ serving as the center. The four third protrusions 723 are farther from the load point $P_L$ than the second ring-shaped protrusion 78 is.

The third protrusion 723 includes a top face 84. The top face 84 has a trapezoidal shape in a planar view. The third protrusion 723 includes a ridge line 841 and a ridge line 842. The ridge line 841 is located closer to the load point $P_L$ than the ridge line 842 is. As illustrated in FIG. 5, the ridge line 841 and the ridge line 842 perpendicularly intersect one of the four virtual straight lines L11, L12, L13, and L14.

<3-4. Modes of Plurality of Protrusions>

In the panel 70 according to the present embodiment, modes of the first protrusion 721, the second protrusions 722, and the third protrusions 723 are set in consideration of surface rigidity against an assumed load applied to the load point $P_L$. That is, as in the panel 10 according to the first embodiment, the heights of the first protrusion 721, the second protrusions 722, and the third protrusions 723 and the inclination angles θ of the side faces forming the first protrusion 721, the second protrusions 722, and the third protrusions 723 can be set in accordance with the magnitude of the assumed load. In addition, as in the panel 10 according to the first embodiment, the widths of the top faces 74, 80, 82, and 84 and the intervals between the first protrusion 721, the second protrusions 722, and the third protrusions 723 can be set in accordance with the magnitude of the assumed load. Thus, the panel 70 provided with appropriate surface rigidity in accordance with the assumed load can be produced with high yield.

The heights of the first protrusion 721, the second protrusions 722, and the third protrusions 723 may all be the same, or some or all may be different. The inclination angles θ of the side faces forming the first protrusion 721, the second protrusions 722, and the third protrusions 723 may all be the same, or some or all may be different. Also the widths of the top faces 74, 80, 82, and 84 may all be the same, or some or all may be different. Also the intervals between the first protrusion 721, the second protrusions 722, and the third protrusions 723 may all be the same, or some or all may be different. The numbers of the second protrusions 722 and the third protrusions 723 can also be set in accordance with the magnitude of the assumed load.

The panel 70 according to the third embodiment described above provides an effect similar to that of the panel 10 of the first embodiment.

«4. Fourth Embodiment »

Figure 7:
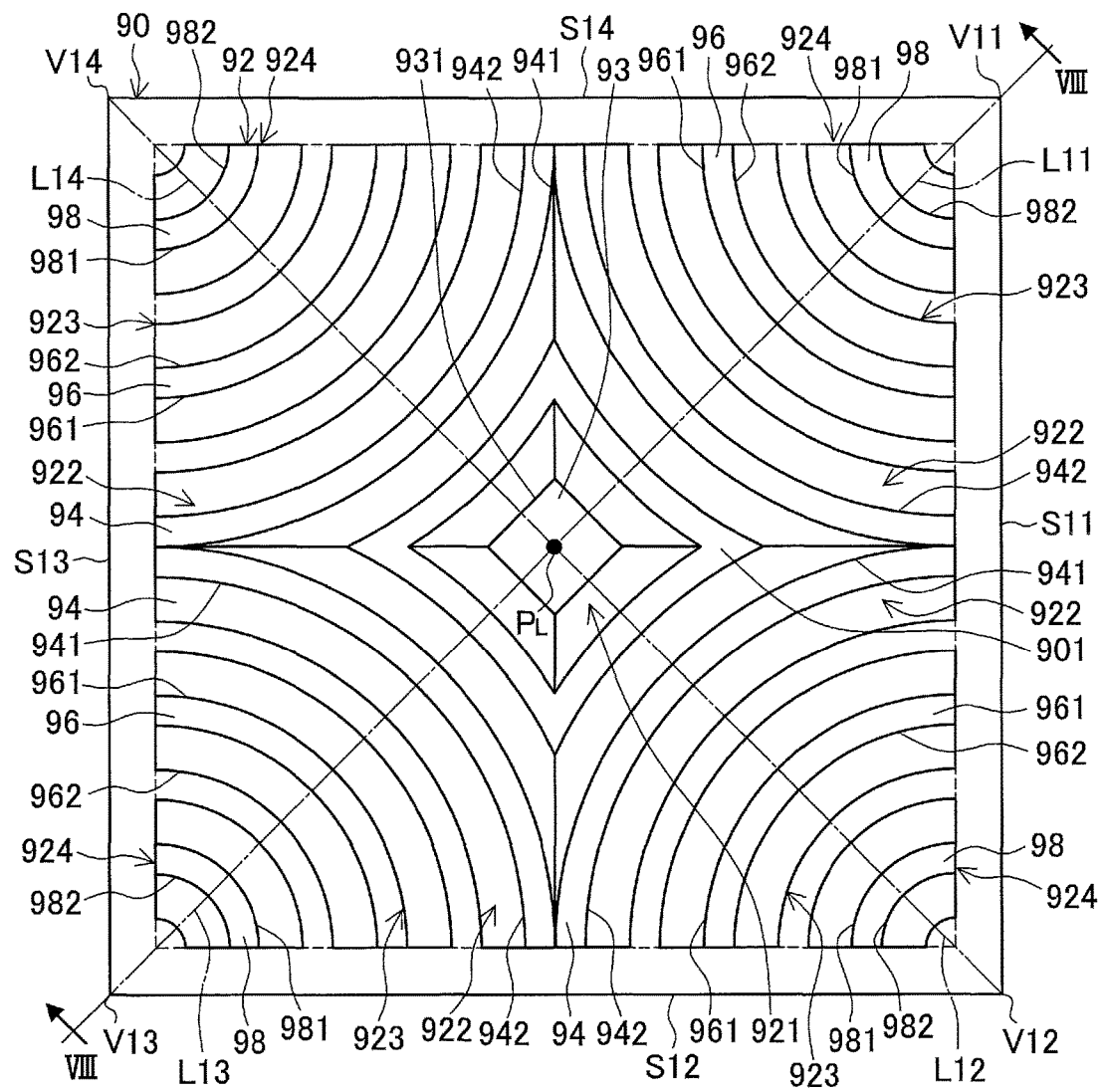
FIG. 7 is a plan view of a panel according to a fourth embodiment.
Figure 8:
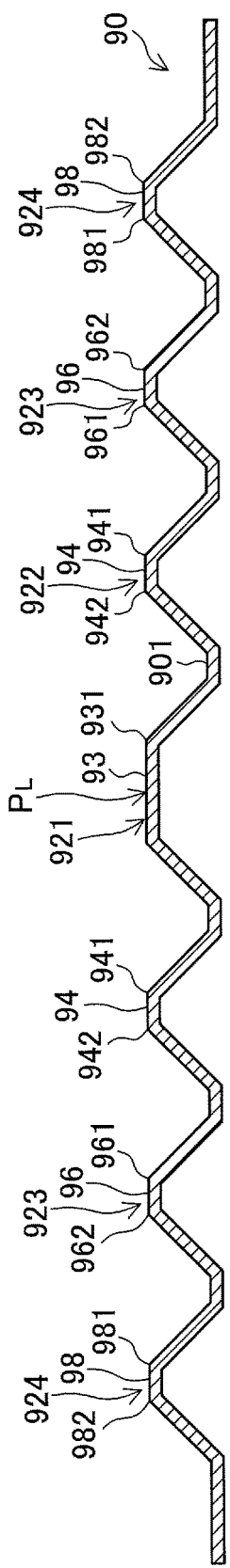
FIG. 8 is a VIII-VIII cross-sectional view of FIG. 7.

A panel 90 according to a fourth embodiment will be described with reference to FIGS. 7 and 8. FIG. 7 is a plan view of the panel 90. FIG. 8 is a VIII-VIII cross-sectional view of FIG. 7. The panel 90 according to the fourth embodiment differs from the panel 10 of the first embodiment in a configuration of a plurality of protrusions 92. The configuration of the protrusions 92 is mainly described below; description is given on differences from the protrusions 16 of the first embodiment.

The protrusions 92 include a first protrusion 921, a second protrusion 922, a plurality (four in the present embodiment) of third protrusions 923, and a plurality (four in the present embodiment) of fourth protrusions 924. Note that the numbers of the second protrusions 922, the third protrusions 923, and the fourth protrusions 924 are set appropriately in consideration of at least surface rigidity against an assumed load applied to the load point $P_L$, as in the panel 10 of the first embodiment.

<4-1. First Protrusion>

The first protrusion 921 protrudes from a surface 901 of the panel 90. The first protrusion 921 is formed concentrically with the load point $P_L$ of the panel 90 in a planar view. The first protrusion 921 includes a top face 93. The top face 93 has a substantially square shape in a planar view. As viewed from the thickness direction of the panel 90, the center of the top face 93 coincides with the load point $P_L$.

The first protrusion 921 includes a ridge line 931. The ridge line 931 has a substantially square shape in a planar view. As illustrated in FIG. 7, the ridge line 931 intersects the four virtual straight lines L11, L12, L13, and L14 perpendicularly. Although not shown, the ridge line 931 intersects all of the virtual straight lines extending radially from the load point $P_L$ at angles within a range of 45 to 90 degrees. In other words, acute angles out of angles formed by the ridge line 931 and the virtual straight lines extending radially from the load point $P_L$ are within a range of 45 to less than 90 degrees.

<4-2. Second Protrusion>

The second protrusion 922 protrudes from the surface 901. The second protrusion 922 is formed concentrically with respect to the load point $P_L$. In other words, the center of the second protrusion 922 coincides with the load point $P_L$ in a planar view. The second protrusion 922 includes four top faces 94. The second protrusion 922 includes four ridge lines 941 and four ridge lines 942. The ridge lines 941 are located closer to the load point $P_L$ than the ridge lines 942 are. The ridge lines 941 and the ridge lines 942 each have a midpoint located closer to the load point $P_L$ than the straight line connecting both ends of the ridge line 941 or the ridge line 942 is. In other words, the ridge lines 941 and the ridge lines 942 each have an arc shape that is convex toward the load point $P_L$ in a planar view. As illustrated in FIG. 7, the ridge lines 941 and the ridge lines 942 perpendicularly intersect the four virtual straight lines L11, L12, L13, and L14.

<4-3. Third Protrusion>

The four third protrusions 923 protrude from the surface 901. The four third protrusions 923 are located around the load point $P_L$ serving as the center. The third protrusions 923 are farther from the load point $P_L$ than the second protrusion 922 is. The third protrusion 923 includes a top face 96. The third protrusion 923 includes a ridge line 961 and a ridge line 962. The ridge line 961 is located closer to the load point $P_L$ than the ridge line 962 is. The ridge line 961 and the ridge line 962 each have a midpoint located closer to the load point $P_L$ than the straight lines connecting both ends of the ridge line 961 and the ridge line 962 are. In other words, the ridge line 961 and the ridge line 962 each have an arc shape that is convex toward the load point $P_L$ in a planar view. As illustrated in FIG. 7, the ridge line 961 and the ridge line 962 perpendicularly intersect one of the four virtual straight lines L11, L12, L13, and L14.

<4-4. Fourth Protrusion>

The four fourth protrusions 924 protrude from the surface 901. The four fourth protrusions 924 are located around the load point $P_L$ serving as the center. The fourth protrusions 924 are farther from the load point $P_L$ than the third protrusions 923 are. The fourth protrusion 924 includes a top face 98. The fourth protrusion 924 includes a ridge line 981 and a ridge line 982. The ridge line 981 is located closer to the load point $P_L$ than the ridge line 982 is. The ridge line 981 and the ridge line 982 each have a midpoint located closer to the load point $P_L$ than the straight lines connecting both ends of the ridge line 981 and the ridge line 982 are. In other words, the ridge line 981 and the ridge line 982 each have an arc shape that is convex toward the load point $P_L$ in a planar view. As illustrated in FIG. 7, the ridge line 981 and the ridge line 982 perpendicularly intersect one of the four virtual straight lines L11, L12, L13, and L14.

<4-5. Modes of Plurality of Protrusions>

In the panel 90 according to the present embodiment, modes of the first protrusion 921, the second protrusion 922, the third protrusions 923, and the fourth protrusions 924 are set in consideration of surface rigidity against an assumed load applied to the load point $P_L$. That is, as in the panel 10 according to the first embodiment, the heights of the first protrusion 921, the second protrusion 922, the third protrusions 923, and the fourth protrusions 924 and the inclination angles θ of the side faces forming the first protrusion 921, the second protrusion 922, the third protrusions 923, and the fourth protrusions 924 can be set in accordance with the magnitude of the assumed load. In addition, as in the panel 10 according to the first embodiment, the widths of the top faces 93, 94, 96, and 98 and the intervals between the first protrusion 921, the second protrusion 922, the third protrusions 923, and the fourth protrusions 924 can be set in accordance with the magnitude of the assumed load. Thus, the panel 90 provided with appropriate surface rigidity in accordance with the assumed load can be produced with high yield.

The heights of the first protrusion 921, the second protrusion 922, the third protrusions 923, and the fourth protrusions 924 may all be the same, or some or all may be different. The inclination angles θ of the side faces forming the first protrusion 921, the second protrusion 922, the third protrusions 923, and the fourth protrusions 924 may all be the same, or some or all may be different. Also the widths of the top faces 93, 94, 96, and 98 may all be the same, or some or all may be different. Also the intervals between the first protrusion 921, the second protrusion 922, the third protrusions 923, and the fourth protrusions 924 may all be the same, or some or all may be different. The numbers of the second protrusions 922, the third protrusions 923, and the fourth protrusions 924 can also be set in accordance with the magnitude of the assumed load.

The panel 90 according to the fourth embodiment described above provides an effect similar to that of the panel 10 of the first embodiment.

«5. Fifth Embodiment»

Figure 9:
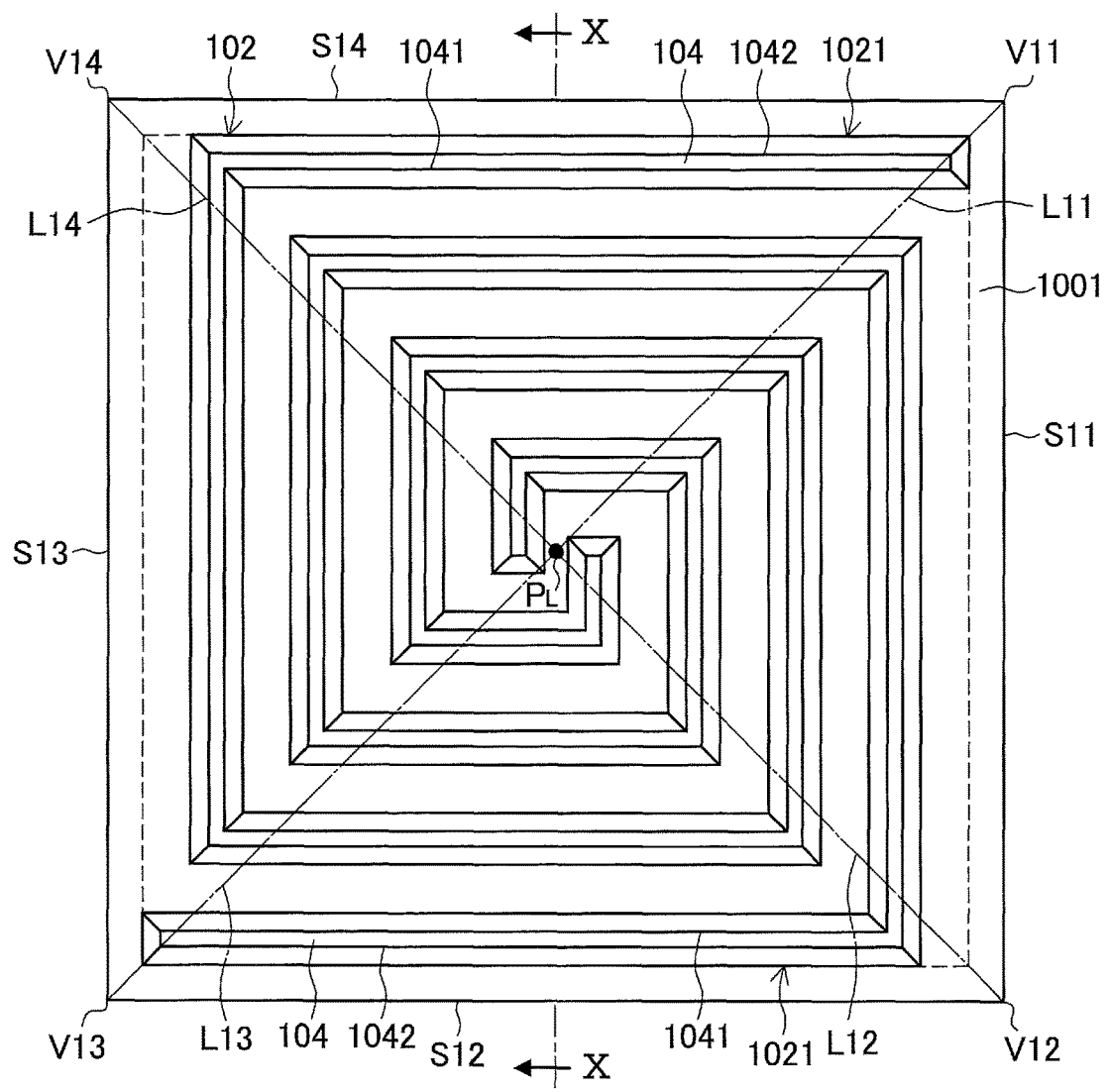
FIG. 9 is a plan view of a panel according to a fifth embodiment.
Figure 10:
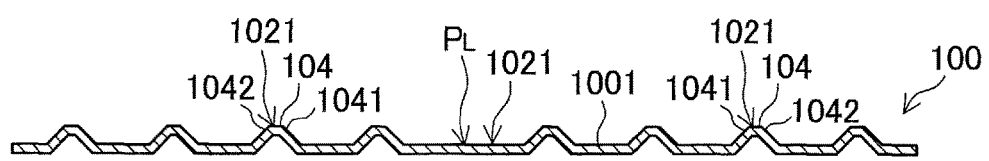
FIG. 10 is a X-X cross-sectional view of FIG. 9.

A panel 100 according to a fifth embodiment will be described with reference to FIGS. 9 and 10. FIG. 9 is a plan view of the panel 100. FIG. 10 is a X-X cross-sectional view of FIG. 9. The panel 100 according to the fifth embodiment differs from the panel 10 of the first embodiment in a configuration of a plurality of protrusions 102. The configuration of the protrusions 102 is mainly described below; description is given on differences from the protrusions 16 of the first embodiment.

The panel 100 according to the present embodiment includes, as the protrusions 102, two protrusions 1021. The number of the protrusions 1021 may be one.

Each protrusion 1021 protrudes from a surface 1001. Each protrusion 1021 has a spiral shape in a planar view. Each protrusion 1021 includes a top face 104. Each protrusion 1021 includes a ridge line 1041 and a ridge line 1042. The ridge line 1041 and the ridge line 1042 each have a spiral shape in a planar view. At a given position of the protrusion 1021, the ridge line 1041 is located closer to the load point $P_L$ than the ridge line 1042 is. As illustrated in FIG. 9, the ridge line 1041 and the ridge line 1042 intersect the four virtual straight lines L11, L12, L13, and L14 at a plurality of positions.

Although not shown, the ridge line 1041 and the ridge line 1042 intersect all of the virtual straight lines extending radially from the load point $P_L$ at angles within a range of 45 to 90 degrees. In other words, acute angles out of angles formed by the ridge line 1041 and the virtual straight lines extending radially from the load point $P_L$ are within a range of 45 to less than 90 degrees, and acute angles out of angles formed by the ridge line 1042 and the virtual straight lines extending radially from the load point $P_L$ are within a range of 45 to less than 90 degrees.

In the panel 100 according to the present embodiment, modes of the protrusions 1021 are set in consideration of surface rigidity against an assumed load applied to the load point $P_L$. That is, as in the panel 10 according to the first embodiment, the heights of the protrusions 1021 and the inclination angles θ of the side faces forming the protrusions 1021 can be set in accordance with the magnitude of the assumed load. In addition, as in the panel 10 according to the first embodiment, the widths of the top faces 104 and the intervals between the protrusions 1021 can be set in accordance with the magnitude of the assumed load. Thus, the panel 100 provided with appropriate surface rigidity in accordance with the assumed load can be produced with high yield.

The heights of the protrusions 1021 may be the same throughout the entire range, or some or all may be different. The inclination angles θ of the side faces forming the protrusions 1021 may be the same throughout the entire range, or some or all may be different. Also the widths of the top faces 104 may be the same throughout the entire range, or some or all may be different. Also the intervals between the protrusions 1021 may be the same throughout the entire range, or some or all may be different. The number of the protrusions 1021 can also be set in accordance with the magnitude of the assumed load.

The panel 100 according to the fifth embodiment described above provides an effect similar to that of the panel 10 of the first embodiment.

«6. Sixth Embodiment»

Figure 11:
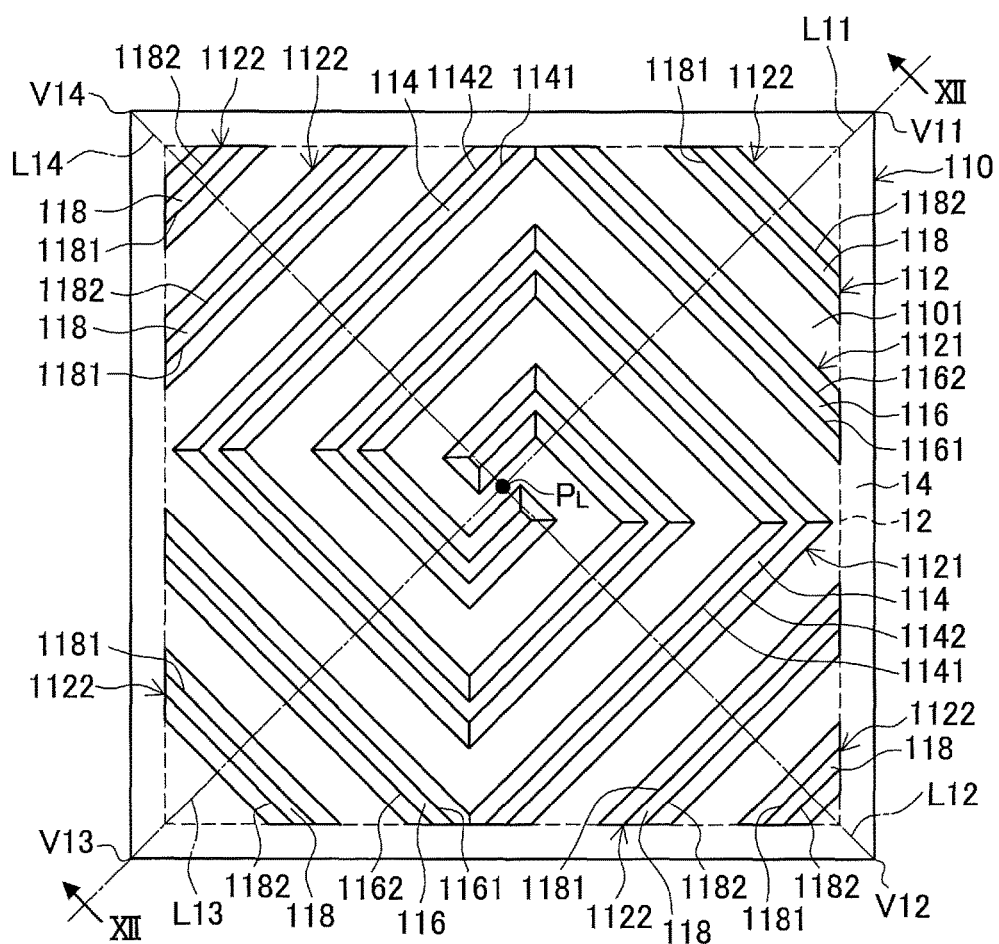
FIG. 11 is a plan view of a panel according to a sixth embodiment.
Figure 12:
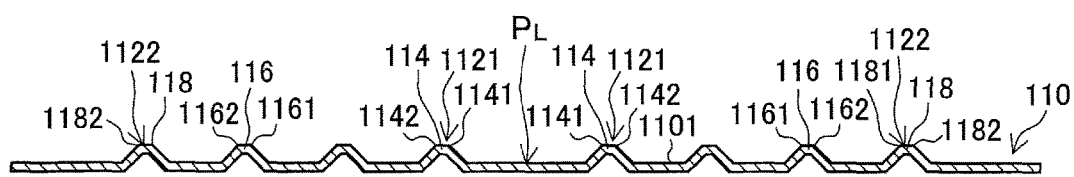
FIG. 12 is a XII-XII cross-sectional view of FIG. 11.

A panel 110 according to a sixth embodiment will be described with reference to FIGS. 11 and 12. FIG. 11 is a plan view of the panel 110. FIG. 12 is a XII-XII cross-sectional view of FIG. 11. The panel 110 according to the sixth embodiment differs from the panel 10 of the first embodiment in a configuration of a plurality of protrusions 112. The configuration of the protrusions 112 is mainly described below; description is given on differences from the protrusions 16 of the first embodiment.

The protrusions 112 include a plurality (two in the present embodiment) of first protrusions 1121 and a plurality (six in the present embodiment) of second protrusions 1122. Note that the numbers of the first protrusions 1121 and the second protrusions 1122 are set appropriately in consideration of at least surface rigidity against an assumed load applied to the load point $P_L$, as in the panel 10 of the first embodiment.

<6-1. First Protrusion>

The first protrusions 1121 protrude from a surface 1101. The first protrusions 1121 each have a spiral shape surrounding the load point $P_L$ serving as a base point in a planar view. The first protrusion 1121 includes a top face 114 and a top face 116. The first protrusion 1121 includes a ridge line 1141, a ridge line 1142, a ridge line 1161, and a ridge line 1162.

The ridge line 1141 and the ridge line 1142 each have a spiral shape in a planar view. As illustrated in FIG. 11, the ridge line 1141 and the ridge line 1142 have portions perpendicularly intersecting the four virtual straight lines L11, L12, L13, and L14. Although not shown, the ridge line 1141 and the ridge line 1142 intersect all of the virtual straight lines extending radially from the load point $P_L$ at angles within a range of 45 to 90 degrees. In other words, acute angles out of angles formed by the ridge line 1141 and the virtual straight lines extending radially from the load point $P_L$ are within a range of 45 to less than 90 degrees, and acute angles out of angles formed by the ridge line 1142 and the virtual straight lines extending radially from the load point $P_L$ are within a range of 45 to less than 90 degrees.

The ridge line 1161 and the ridge line 1162 are parallel to each other in a planar view. The ridge line 1161 and the ridge line 1162 of one of the two first protrusions 1121 perpendicularly intersect the virtual straight line L11. The ridge line 1161 and the ridge line 1162 of the other of the two first protrusions 1121 perpendicularly intersect the virtual straight line L13.

<6-2. Second Protrusion>

The six second protrusions 1122 protrude from the surface 1101. The second protrusions 1122 are farther from the load point $P_L$ than the first protrusions 1121 are. The second protrusion 1122 includes a top face 118. The second protrusion 1122 includes a ridge line 1181 and a ridge line 1182. The ridge line 1181 is located closer to the load point $P_L$ than the ridge line 1182 is.

One of the six second protrusions 1122 is located at a position intersecting the virtual straight line L11. In this second protrusion 1122, as illustrated in FIG. 11, the ridge line 1181 and the ridge line 1182 perpendicularly intersect the virtual straight line L11. Two of the six second protrusions 1122 are located at positions intersecting the virtual straight line L12. In these second protrusions 1122, as illustrated in FIG. 11, the ridge line 1181 and the ridge line 1182 perpendicularly intersect the virtual straight line L12.

One of the six second protrusions 1122 is located at a position intersecting the virtual straight line L13. In this second protrusion 1122, as illustrated in FIG. 11, the ridge line 1181 and the ridge line 1182 perpendicularly intersect the virtual straight line L13. Two of the six second protrusions 1122 are located at positions intersecting the virtual straight line L14. In these second protrusions 1122, as illustrated in FIG. 11, the ridge line 1181 and the ridge line 1182 perpendicularly intersect the virtual straight line L14.

<6-3. Modes of Plurality of Protrusions>

In the panel 110 according to the present embodiment, modes of the first protrusions 1121 and the second protrusions 1122 are set in consideration of surface rigidity against an assumed load applied to the load point $P_L$. That is, as in the panel 10 according to the first embodiment, the heights of the first protrusions 1121 and the second protrusions 1122 and the inclination angles θ of the side faces forming the first protrusions 1121 and the second protrusions 1122 can be set in accordance with the magnitude of the assumed load. In addition, as in the panel 10 according to the first embodiment, the widths of the top faces 114, 116, and 118 and the intervals between the first protrusions 1121 and the second protrusions 1122 can be set in accordance with the magnitude of the assumed load. Thus, the panel 110 provided with appropriate surface rigidity in accordance with the assumed load can be produced with high yield.

The heights of the first protrusions 1121 and the second protrusions 1122 may all be the same, or some or all may be different. The inclination angles θ of the side faces forming the first protrusions 1121 and the second protrusions 1122 may all be the same, or some or all may be different. Also the widths of the top faces 114, 116, and 118 may all be the same, or some or all may be different. Also the intervals between the first protrusions 1121 and the second protrusions 1122 may all be the same, or some or all may be different. The numbers of the first protrusions 1121 and the second protrusions 1122 can also be set in accordance with the magnitude of the assumed load.

The panel 110 according to the sixth embodiment described above provides an effect similar to that of the panel 10 of the first embodiment.

« 7. Seventh Embodiment »

Figure 13:
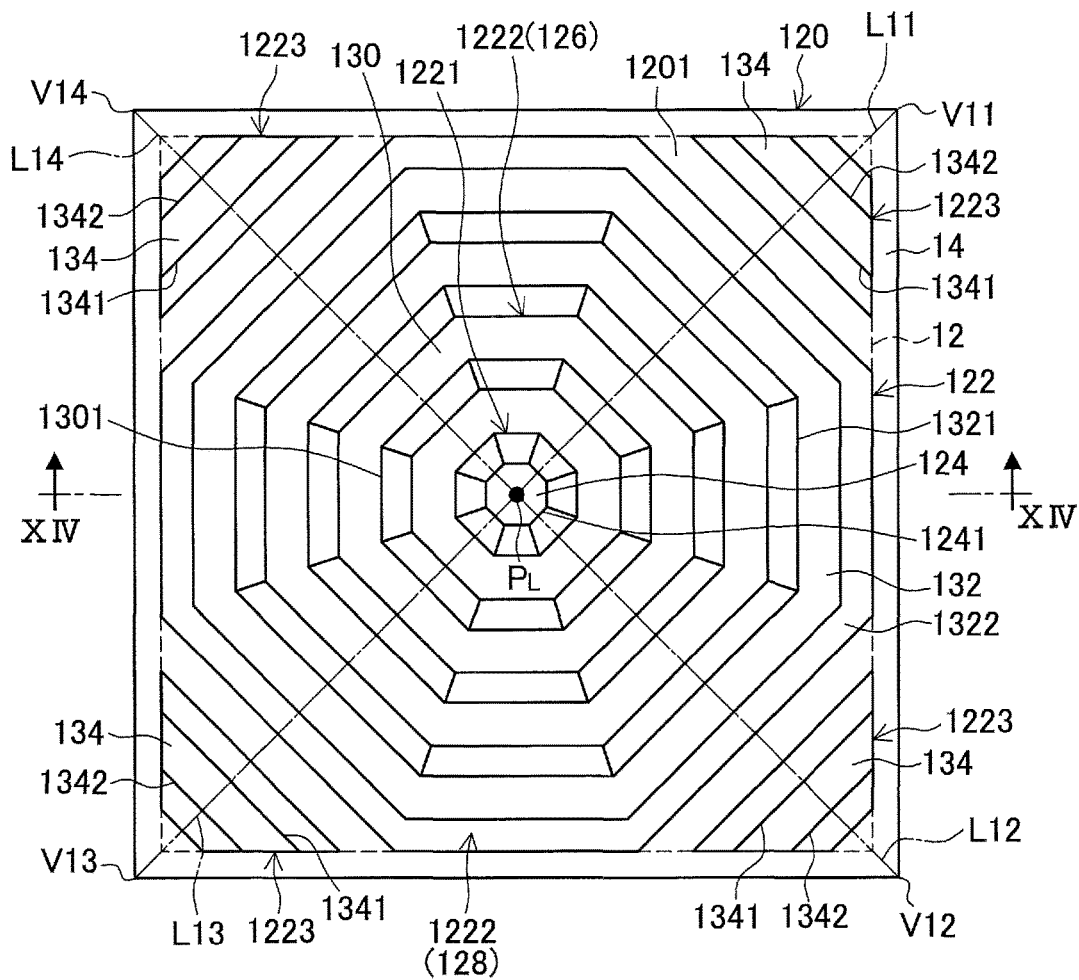
FIG. 13 is a plan view of a panel according to a seventh embodiment.
Figure 14:
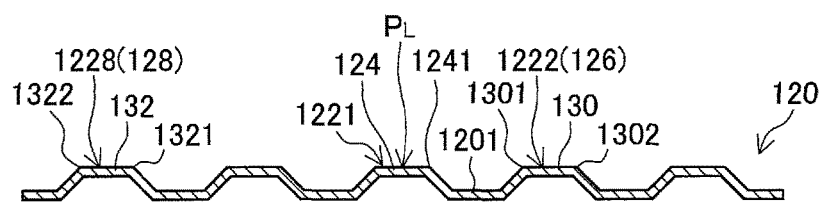
FIG. 14 is a XIV-XIV cross-sectional view of FIG. 13.

A panel 120 according to a seventh embodiment will be described with reference to FIGS. 13 and 14. FIG. 13 is a plan view of the panel 120. FIG. 14 is a XIV-XIV cross-sectional view of FIG. 13. The panel 120 according to the seventh embodiment differs from the panel 10 of the first embodiment in a configuration of a plurality of protrusions 122. The configuration of the protrusions 122 is mainly described below; description is given on differences from the protrusions 16 of the first embodiment.

The protrusions 122 include a first protrusion 1221, a plurality (two in the present embodiment) of second protrusions 1222, and a plurality (four in the present embodiment) of third protrusions 1223. Note that the numbers of the second protrusions 1222 and the third protrusions 1223 are set appropriately in consideration of at least surface rigidity against an assumed load applied to the load point $P_L$, as in the panel 10 of the first embodiment.

<7-1. First Protrusion>

The first protrusion 1221 protrudes from a surface 1201 of the panel 120. The first protrusion 1221 is formed concentrically with the load point $P_L$ of the panel 120 in a planar view. The first protrusion 1221 includes a top face 124. The top face 124 has a regular octagonal shape in a planar view. As viewed from the thickness direction of the panel 120, the center of the top face 124 coincides with the load point $P_L$.

The first protrusion 1221 includes a ridge line 1241. The ridge line 1241 has a square shape in a planar view. As illustrated in FIG. 13, the ridge line 1241 intersects the four virtual straight lines L11, L12, L13, and L14 perpendicularly. Although not shown, the ridge line 1241 intersects all of the virtual straight lines extending radially from the load point $P_L$ at angles within a range of 45 to 90 degrees. In other words, acute angles out of angles formed by the ridge line 1241 and the virtual straight lines extending radially from the load point $P_L$ are within a range of 45 to less than 90 degrees.

<7-2. Second Protrusion>

The two second protrusions 1222 each protrude from the surface 1201.

The two second protrusions 1222 are formed concentrically with respect to the load point $P_L$. Hereinafter, one of the two second protrusions 1222 that is closer to the load point $P_L$ will be called a first ring-shaped protrusion 126, and one of the two second protrusions 1222 that is farther from the load point $P_L$ will be called a second ring-shaped protrusion 128.

<7-2-1. First Ring-shaped Protrusion>

The first ring-shaped protrusion 126 includes a top face 130. The top face 130 has a regular octagonal frame shape in a planar view. The first ring-shaped protrusion 126 includes a ridge line 1301 and a ridge line 1302. The ridge line 1301 is located closer to the load point $P_L$ than the ridge line 1302 is. The ridge line 1301 and the ridge line 1302 each have a regular octagonal shape in a planar view. As illustrated in FIG. 13, the ridge line 1301 and the ridge line 1302 intersect the four virtual straight lines L11, L12, L13, and L14 perpendicularly. Although not shown, the ridge line 1301 and the ridge line 1302 intersect all of the virtual straight lines extending radially from the load point $P_L$ at angles within a range of 45 to 90 degrees. In other words, acute angles out of angles formed by the ridge line 1301 and the virtual straight lines extending radially from the load point $P_L$ are within a range of 45 to less than 90 degrees, and acute angles out of angles formed by the ridge line 1302 and the virtual straight lines extending radially from the load point $P_L$ are within a range of 45 to less than 90 degrees.

<7-2-2. Second Ring-shaped Protrusion>

The second ring-shaped protrusion 128 includes a top face 132. The top face 132 has a regular octagonal frame shape in a planar view. The second ring-shaped protrusion 128 includes a ridge line 1321 and a ridge line 1322. The ridge line 1321 is located closer to the load point $P_L$ than the ridge line 1322 is. The ridge line 1321 and the ridge line 1322 each have a regular octagonal shape in a planar view. As illustrated in FIG. 13, the ridge line 1321 and the ridge line 1322 intersect the four virtual straight lines L11, L12, L13, and L14 perpendicularly. Although not shown, the ridge line 1321 and the ridge line 1322 intersect all of the virtual straight lines extending radially from the load point $P_L$ at angles within a range of 45 to 90 degrees. In other words, acute angles out of angles formed by the ridge line 1321 and the virtual straight lines extending radially from the load point $P_L$ are within a range of 45 to less than 90 degrees, and acute angles out of angles formed by the ridge line 1322 and the virtual straight lines extending radially from the load point $P_L$ are within a range of 45 to less than 90 degrees.

<7-3. Third Protrusion>

The third protrusions 1223 protrude from the surface 1201. The third protrusions 1223 each have a substantially trapezoidal shape in a planar view. The third protrusions 1223 are farther from the load point $P_L$ than the second ring-shaped protrusion 128 is. The third protrusion 1223 includes a top face 134. The top face 134 has a trapezoidal shape in a planar view. The ring-shaped third protrusion 1223 includes a ridge line 1341 and a ridge line 1342. The ridge line 1341 is located closer to the load point $P_L$ than the ridge line 1342 is. As illustrated in FIG. 13, the ridge line 1341 and the ridge line 1342 perpendicularly intersect one of the four virtual straight lines L11, L12, L13, and L14.

<7-4. Modes of Plurality of Protrusions>

In the panel 120 according to the present embodiment, modes of the first protrusion 1221, the second protrusions 1222, and the third protrusions 1223 are set in consideration of surface rigidity against an assumed load applied to the load point $P_L$. That is, as in the panel 10 according to the first embodiment, the heights of the first protrusion 1221, the second protrusions 1222, and the third protrusions 1223 and the inclination angles θ of the side faces forming the first protrusion 1221, the second protrusions 1222, and the third protrusions 1223 can be set in accordance with the magnitude of the assumed load. In addition, as in the panel 10 according to the first embodiment, the widths of the top faces 124, 130, 132, and 134 and the intervals between the first protrusion 1221, the second protrusions 1222, and the third protrusions 1223 can be set in accordance with the magnitude of the assumed load. Thus, the panel 120 provided with appropriate surface rigidity in accordance with the assumed load can be produced with high yield.

The heights of the first protrusion 1221, the second protrusions 1222, and the third protrusions 1223 may all be the same, or some or all may be different. The inclination angles θ of the side faces forming the first protrusion 1221, the second protrusions 1222, and the third protrusions 1223 may all be the same, or some or all may be different. Also the widths of the top faces 124, 130, 132, and 134 may all be the same, or some or all may be different. Also the intervals between the first protrusion 1221, the second protrusions 1222, and the third protrusions 1223 may all be the same, or some or all may be different. The numbers of the second protrusions 1222 and the third protrusions 1223 can also be set in accordance with the magnitude of the assumed load.

The panel 90 according to the seventh embodiment described above provides an effect similar to that of the panel 10 of the first embodiment.

«8. Eighth Embodiment»

Figure 15:
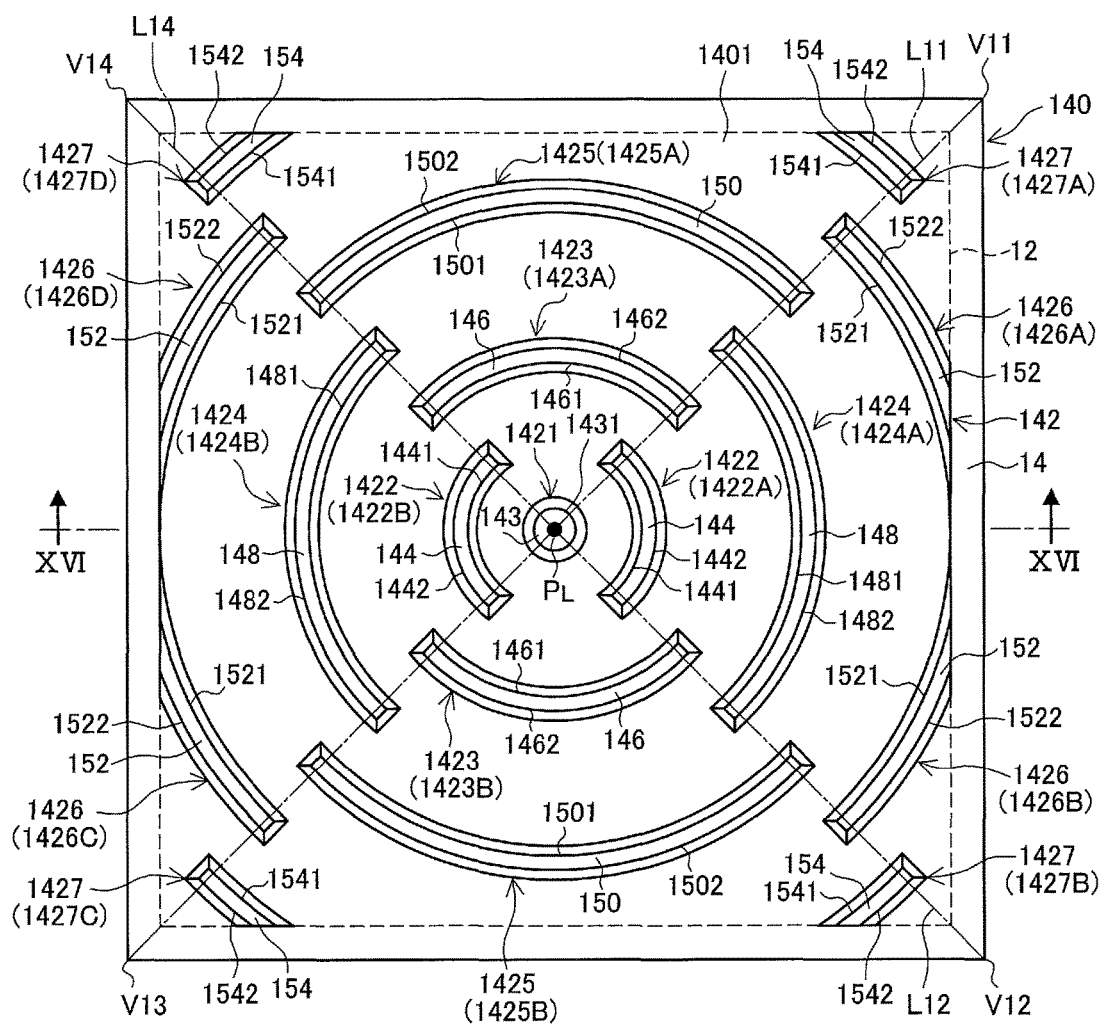
FIG. 15 is a plan view of a panel according to an eighth embodiment.
Figure 16:
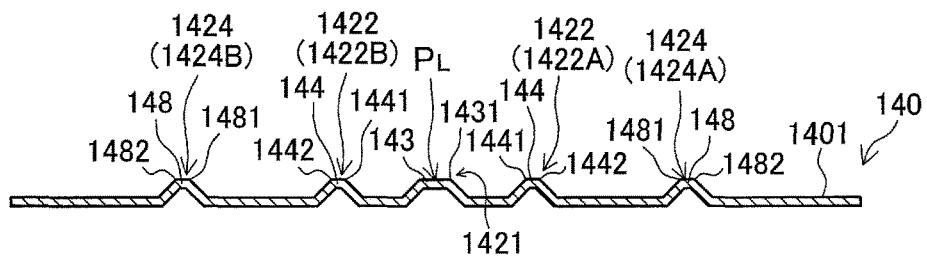
FIG. 16 is a XVI-XVI cross-sectional view of FIG. 15.

A panel 140 according to an eighth embodiment will be described with reference to FIGS. 15 and 16. FIG. 15 is a plan view of the panel 140. FIG. 16 is a XVI-XVI cross-sectional view of FIG. 15. The panel 140 according to the eighth embodiment differs from the panel 10 of the first embodiment in a configuration of a plurality of protrusions 142. The configuration of the protrusions 142 is mainly described below; description is given on differences from the protrusions 16 of the first embodiment. In the following description, in the clockwise direction, i.e., the right-handed direction, the starting point side is called one end in the circumferential direction, and the endpoint side is called the other end in the circumferential direction.

The protrusions 142 include a first protrusion 1421, a plurality (two in the present embodiment) of second protrusions 1422, a plurality (two in the present embodiment) of third protrusions 1423, a plurality (two in the present embodiment) of fourth protrusions 1424, a plurality (two in the present embodiment) of fifth protrusions 1425, a plurality (four in the present embodiment) of sixth protrusions 1426, and a plurality (four in the present embodiment) of seventh protrusions 1427. Note that the numbers of the first protrusion 1421 to the seventh protrusions 1427 are set appropriately in consideration of at least surface rigidity against an assumed load applied to the load point $P_L$, as in the panel 10 of the first embodiment.

<8-1. First Protrusion>

The first protrusion 1421 is located on the load point $P_L$. The first protrusion 1421 includes a top face 143. The first protrusion 1421 includes a ridge line 1431. The top face 143 and the ridge line 1431 each have a circular shape in a planar view. As viewed from the thickness direction of the panel 140, the center of the top face 143 and the center of the ridge line 1431 coincide with the load point $P_L$.

<8-2. Second Protrusion>

The two second protrusions 1422 are located on a first circle whose center is the load point $P_L$. The second protrusion 1422 includes a top face 144. The second protrusion 1422 includes a ridge line 1441 and a ridge line 1442. The ridge line 1441 is located closer to the load point $P_L$ than the ridge line 1442 is. The ridge line 1441 and the ridge line 1442 each have a midpoint located farther from the load point $P_L$ than the straight lines connecting both ends of the ridge line 1441 and the ridge line 1442 are. In other words, the ridge line 1441 and the ridge line 1442 each have an arc shape that is convex toward a direction going away from the load point $P_L$ in a planar view. As illustrated in FIG. 15, the ridge line 1441 and the ridge line 1442 perpendicularly intersect two of the four virtual straight lines L11, L12, L13, and L14.

One of the two second protrusions 1422 is called the second protrusion 1422A, and the other is called the second protrusion 1422B. One end part in the circumferential direction of the second protrusion 1422A perpendicularly intersects the virtual straight line L11. The other end part in the circumferential direction of the second protrusion 1422A perpendicularly intersects the virtual straight line L12. One end part in the circumferential direction of the second protrusion 1422B perpendicularly intersects the virtual straight line L13. The other end part in the circumferential direction of the second protrusion 1422B perpendicularly intersects the virtual straight line L14.

<8-3. Third Protrusion>

The two third protrusions 1423 are located on a second circle whose center is the load point $P_L$. The second circle has a larger diameter than the first circle. The third protrusion 1423 includes a top face 146. The third protrusion 1423 includes a ridge line 1461 and a ridge line 1462. The ridge line 1461 is located closer to the load point $P_L$ than the ridge line 1462 is. The ridge line 1461 and the ridge line 1462 each have a midpoint located farther from the load point $P_L$ than the straight lines connecting both ends of the ridge line 1461 and the ridge line 1462 are. In other words, the ridge line 1461 and the ridge line 1462 each have an arc shape that is convex toward a direction going away from the load point $P_L$ in a planar view. As illustrated in FIG. 15, the ridge line 1461 and the ridge line 1462 perpendicularly intersect two of the four virtual straight lines L11, L12, L13, and L14.

One of the two third protrusions 1423 is called the third protrusion 1423A, and the other is called the third protrusion 1423B. One end part in the circumferential direction of the third protrusion 1423A perpendicularly intersects the virtual straight line L14. The other end part in the circumferential direction of the third protrusion 1423A perpendicularly intersects the virtual straight line L11. One end part in the circumferential direction of the third protrusion 1423B perpendicularly intersects the virtual straight line L12. The other end part in the circumferential direction of the third protrusion 1423B perpendicularly intersects the virtual straight line L13.

As viewed from the direction along which the virtual straight line L14 extends, the one end part in the circumferential direction of the third protrusion 1423A overlaps with the other end part in the circumferential direction of the second protrusion 1422B. As viewed from the direction along which the virtual straight line L11 extends, the other end part in the circumferential direction of the third protrusion 1423A overlaps with the one end part in the circumferential direction of the second protrusion 1422A. As viewed from the direction along which the virtual straight line L12 extends, the one end part in the circumferential direction of the third protrusion 1423B overlaps with the other end part in the circumferential direction of the second protrusion 1422A. As viewed from the direction along which the virtual straight line L13 extends, the other end part in the circumferential direction of the third protrusion 1423B overlaps with the one end part in the circumferential direction of the second protrusion 1422B.

<8-4. Fourth Protrusion>

The two fourth protrusions 1424 are located on a third circle whose center is the load point $P_L$. The third circle has a larger diameter than the second circle. The fourth protrusion 1424 includes a top face 148. The fourth protrusion 1424 includes a ridge line 1481 and a ridge line 1482. The ridge line 1481 is located closer to the load point $P_L$ than the ridge line 1482 is. The ridge line 1481 and the ridge line 1482 each have a midpoint located farther from the load point $P_L$ than the straight lines connecting both ends of the ridge line 1481 and the ridge line 1482 are. In other words, the ridge line 1481 and the ridge line 1482 each have an arc shape that is convex toward a direction going away from the load point $P_L$ in a planar view. As illustrated in FIG. 15, the ridge line 1481 and the ridge line 1482 perpendicularly intersect two of the four virtual straight lines L11, L12, L13, and L14.

One of the two fourth protrusions 1424 is called the fourth protrusion 1424A, and the other is called the fourth protrusion 1424B. One end part in the circumferential direction of the fourth protrusion 1424A perpendicularly intersects the virtual straight line L11. The other end part in the circumferential direction of the second protrusion 1422A perpendicularly intersects the virtual straight line L12. One end part in the circumferential direction of the fourth protrusion 1424B perpendicularly intersects the virtual straight line L13. The other end part in the circumferential direction of the fourth protrusion 1424B perpendicularly intersects the virtual straight line L14.

As viewed from the direction along which the virtual straight line L11 extends, the one end part in the circumferential direction of the fourth protrusion 1424A overlaps with the other end part in the circumferential direction of the third protrusion 1423A and the one end part in the circumferential direction of the second protrusion 1422A. As viewed from the direction along which the virtual straight line L12 extends, the other end part in the circumferential direction of the fourth protrusion 1424A overlaps with the one end part in the circumferential direction of the third protrusion 1423B and the other end part in the circumferential direction of the second protrusion 1422A. As viewed from the direction along which the virtual straight line L13 extends, the one end part in the circumferential direction of the fourth protrusion 1424B overlaps with the other end part in the circumferential direction of the third protrusion 1423B and the one end part in the circumferential direction of the second protrusion 1422B. As viewed from the direction along which the virtual straight line L14 extends, the other end part in the circumferential direction of the fourth protrusion 1424B overlaps with the other end part in the circumferential direction of the third protrusion 1423A and the one end part in the circumferential direction of the third protrusion 1423B.

<8-5. Fifth Protrusion>

The two fifth protrusions 1425 are located on a fourth circle whose center is the load point $P_L$. The fourth circle has a larger diameter than the third circle. The fifth protrusion 1425 includes a top face 150. The fifth protrusion 1425 includes a ridge line 1501 and a ridge line 1502. The ridge line 1501 is located closer to the load point $P_L$ than the ridge line 1502 is. The ridge line 1501 and the ridge line 1502 each have a midpoint located farther from the load point $P_L$ than the straight lines connecting both ends of the ridge line 1501 and the ridge line 1502 are. In other words, the ridge line 1501 and the ridge line 1502 each have an arc shape that is convex toward a direction going away from the load point $P_L$ in a planar view. As illustrated in FIG. 15, the ridge line 1501 and the ridge line 1502 perpendicularly intersect two of the four virtual straight lines L11, L12, L13, and L14.

One of the two fifth protrusions 1425 is called the fifth protrusion 1425A, and the other is called the fifth protrusion 1425B. One end part in the circumferential direction of the fifth protrusion 1425A perpendicularly intersects the virtual straight line L14. The other end part in the circumferential direction of the fifth protrusion 1425A perpendicularly intersects the virtual straight line L11. One end part in the circumferential direction of the fifth protrusion 1425B perpendicularly intersects the virtual straight line L12. The other end part in the circumferential direction of the fifth protrusion 1425B perpendicularly intersects the virtual straight line L13.

As viewed from the direction along which the virtual straight line L14 extends, the one end part in the circumferential direction of the fifth protrusion 1425A overlaps with the other end part in the circumferential direction of the fourth protrusion 1424B, the one end part in the circumferential direction of the third protrusion 1423A, and the other end part in the circumferential direction of the third protrusion 1423B. As viewed from the direction along which the virtual straight line L11 extends, the other end part in the circumferential direction of the fifth protrusion 1425A overlaps with the one end part in the circumferential direction of the fourth protrusion 1424A, the other end part in the circumferential direction of the third protrusion 1423A, and the one end part in the circumferential direction of the second protrusion 1422A. As viewed from the direction along which the virtual straight line L12 extends, the one end part in the circumferential direction of the fifth protrusion 1425B overlaps with the other end part in the circumferential direction of the fourth protrusion 1424A, the one end part in the circumferential direction of the third protrusion 1423B, and the other end part in the circumferential direction of the second protrusion 1422A. As viewed from the direction along which the virtual straight line L13 extends, the other end part in the circumferential direction of the fifth protrusion 1425B overlaps with the one end part in the circumferential direction of the fourth protrusion 1424B, the other end part in the circumferential direction of the third protrusion 1423B, and the one end part in the circumferential direction of the second protrusion 1422B.

<8-6. Sixth Protrusion>

The four sixth protrusions 1426 are located on a fifth circle whose center is the load point $P_L$. The fifth circle has a larger diameter than the fourth circle. The sixth protrusion 1426 includes a top face 152. The sixth protrusion 1426 includes a ridge line 1521 and a ridge line 1522. The ridge line 1521 is located closer to the load point $P_L$ than the ridge line 1522 is. The ridge line 1521 and the ridge line 1522 each have a midpoint located farther from the load point $P_L$ than the straight lines connecting both ends of the ridge line 1521 and the ridge line 1522 are. In other words, the ridge line 1521 and the ridge line 1522 each have an arc shape that is convex toward a direction going away from the load point $P_L$ in a planar view. As illustrated in FIG. 15, the ridge line 1521 and the ridge line 1522 perpendicularly intersect one of the four virtual straight lines L11, L12, L13, and L14.

One end part in the circumferential direction of the sixth protrusion 1426A out of the four sixth protrusions 1426 perpendicularly intersects the virtual straight line L11. The other end in the circumferential direction of the sixth protrusion 1426A is located at the boundary between the reinforced section 12 and the peripheral edge 14. As viewed from the direction along which the virtual straight line L11 extends, the one end part in the circumferential direction of the sixth protrusion 1426A overlaps with the other end part in the circumferential direction of the fifth protrusion 1425A, the one end part in the circumferential direction of the fourth protrusion 1424A, the other end part in the circumferential direction of the third protrusion 1423A, and the one end part in the circumferential direction of the second protrusion 1422A.

One end in the circumferential direction of the sixth protrusion 1426B out of the four sixth protrusions 1426 is located at the boundary between the reinforced section 12 and the peripheral edge 14. The other end part in the circumferential direction of the sixth protrusion 1426B perpendicularly intersects the virtual straight line L12. As viewed from the direction along which the virtual straight line L12 extends, the other end part in the circumferential direction of the sixth protrusion 1426B overlaps with the one end part in the circumferential direction of the fifth protrusion 1425B, the other end part in the circumferential direction of the fourth protrusion 1424A, the one end part in the circumferential direction of the third protrusion 1423B, and the other end part in the circumferential direction of the second protrusion 1422A.

One end part in the circumferential direction of the sixth protrusion 1426C out of the four sixth protrusions 1426 perpendicularly intersects the virtual straight line L13. The other end in the circumferential direction of the sixth protrusion 1426C is located at the boundary between the reinforced section 12 and the peripheral edge 14. As viewed from the direction along which the virtual straight line L13 extends, the one end part in the circumferential direction of the sixth protrusion 1426C overlaps with the other end part in the circumferential direction of the fifth protrusion 1425B, the one end part in the circumferential direction of the fourth protrusion 1424B, the other end part in the circumferential direction of the third protrusion 1423B, and the one end part in the circumferential direction of the second protrusion 1422B.

One end in the circumferential direction of the sixth protrusion 1426D out of the four sixth protrusions 1426 is located at the boundary between the reinforced section 12 and the peripheral edge 14. The other end part in the circumferential direction of the sixth protrusion 1426D perpendicularly intersects the virtual straight line L14. As viewed from the direction along which the virtual straight line L14 extends, the other end part in the circumferential direction of the sixth protrusion 1426D overlaps with the one end part in the circumferential direction of the fifth protrusion 1425A, the other end part in the circumferential direction of the fourth protrusion 1424B, the one end part in the circumferential direction of the third protrusion 1423A, and the other end part in the circumferential direction of the second protrusion 1422B.

<8-7. Seventh Protrusion>

The four seventh protrusions 1427 are located on a sixth circle whose center is the load point $P_L$. The sixth circle has a larger diameter than the fifth circle. The seventh protrusion 1427 includes a top face 154. The seventh protrusion 1427 includes a ridge line 1541 and a ridge line 1542. The ridge line 1541 is located closer to the load point $P_L$ than the ridge line 1542 is. The ridge line 1541 and the ridge line 1542 each have a midpoint located farther from the load point $P_L$ than the straight lines connecting both ends of the ridge line 1541 and the ridge line 1542 are. In other words, the ridge line 1541 and the ridge line 1542 each have an arc shape that is convex toward a direction going away from the load point $P_L$ in a planar view. As illustrated in FIG. 15, the ridge line 1541 and the ridge line 1542 perpendicularly intersect one of the four virtual straight lines L11, L12, L13, and L14.

One end in the circumferential direction of the seventh protrusion 1427A out of the four seventh protrusions 1427 is located at the boundary between the reinforced section 12 and the peripheral edge 14. The other end part in the circumferential direction of the seventh protrusion 1427A perpendicularly intersects the virtual straight line L11. As viewed from the direction along which the virtual straight line L11 extends, the other end part in the circumferential direction of the seventh protrusion 1427 overlaps with the one end part in the circumferential direction of the sixth protrusion 1426A, the other end part in the circumferential direction of the fifth protrusion 1425A, the one end part in the circumferential direction of the fourth protrusion 1424A, the other end part in the circumferential direction of the third protrusion 1423A, and the one end part in the circumferential direction of the second protrusion 1422A.

One end part in the circumferential direction of the seventh protrusion 1427B out of the four seventh protrusions 1427 perpendicularly intersects the virtual straight line L12. The other end in the circumferential direction of the seventh protrusion 1427A is located at the boundary between the reinforced section 12 and the peripheral edge 14. As viewed from the direction along which the virtual straight line L12 extends, the one end part in the circumferential direction of the seventh protrusion 1427B overlaps with the other end part in the circumferential direction of the sixth protrusion 1426B, the one end part in the circumferential direction of the fifth protrusion 1425B, the other end part in the circumferential direction of the fourth protrusion 1424A, the one end part in the circumferential direction of the third protrusion 1423B, and the other end part in the circumferential direction of the second protrusion 1422A.

One end in the circumferential direction of the seventh protrusion 1427C out of the four seventh protrusions 1427 is located at the boundary between the reinforced section 12 and the peripheral edge 14. The other end part in the circumferential direction of the seventh protrusion 1427C perpendicularly intersects the virtual straight line L13. As viewed from the direction along which the virtual straight line L13 extends, the other end part in the circumferential direction of the seventh protrusion 1427C overlaps with the one end part in the circumferential direction of the sixth protrusion 1426C, the other end part in the circumferential direction of the fifth protrusion 1425B, the one end part in the circumferential direction of the fourth protrusion 1424B, the other end part in the circumferential direction of the third protrusion 1423B, and the one end part in the circumferential direction of the second protrusion 1422B.

One end part in the circumferential direction of the seventh protrusion 1427D out of the four seventh protrusions 1427 perpendicularly intersects the virtual straight line L14. The other end in the circumferential direction of the seventh protrusion 1427D is located at the boundary between the reinforced section 12 and the peripheral edge 14. As viewed from the direction along which the virtual straight line L14 extends, the one end part in the circumferential direction of the seventh protrusion 1427D overlaps with the other end part in the circumferential direction of the sixth protrusion 1426D, the one end part in the circumferential direction of the fifth protrusion 1425A, the other end part in the circumferential direction of the fourth protrusion 1424B, the one end part in the circumferential direction of the third protrusion 1423A, and the other end part in the circumferential direction of the second protrusion 1422B.

<8-8. Modes of Plurality of Protrusions>

In the panel 140 according to the present embodiment, modes of the first protrusion 1421 to the seventh protrusions 1427 are set in consideration of surface rigidity against an assumed load applied to the load point $P_L$. That is, as in the panel 10 according to the first embodiment, the heights of the first protrusion 1421 to the seventh protrusions 1427 and the inclination angles θ of the side faces forming the first protrusion 1421 to the seventh protrusions 1427 can be set in accordance with the magnitude of the assumed load. In addition, as in the panel 10 according to the first embodiment, the widths of the top faces 143, 144, 146, 148, 150, 152, and 154 and the intervals between the first protrusion 1421 to the seventh protrusions 1427 can be set in accordance with the magnitude of the assumed load. Thus, the panel 140 provided with appropriate surface rigidity in accordance with the assumed load can be produced with high yield.

The heights of the first protrusion 1421 to the seventh protrusions 1427 may all be the same, or some or all may be different. The inclination angles θ of the side faces forming the first protrusion 1421 to the seventh protrusions 1427 may all be the same, or some or all may be different. Also the widths of the top faces 143, 144, 146, 148, 150, 152, and 154 may all be the same, or some or all may be different. Also the intervals between the first protrusion 1421 to the seventh protrusions 1427 may all be the same, or some or all may be different. The numbers of the first protrusion 1421 to the seventh protrusions 1427 can also be set in accordance with the magnitude of the assumed load.

As viewed from the direction along which the virtual straight line L11 extends, in two protrusions adjacent to each other in the direction, the circumferential length of portions that overlap with each other is set appropriately, in accordance with surface rigidity against an assumed load applied to the load point $P_L$. Here, as illustrated in FIG. 15, the circumferential length of the portions overlapping with each other may be the same for two adjacent protrusions close to the load point $P_L$ and two adjacent protrusions far away from the load point $P_L$. In other words, in two protrusions adjacent to each other in the direction along which the virtual straight line L11 extends, edges of the end parts in the circumferential direction intersecting the virtual straight line L11 may extend in a direction parallel to the virtual straight line L11.

Figure 17:
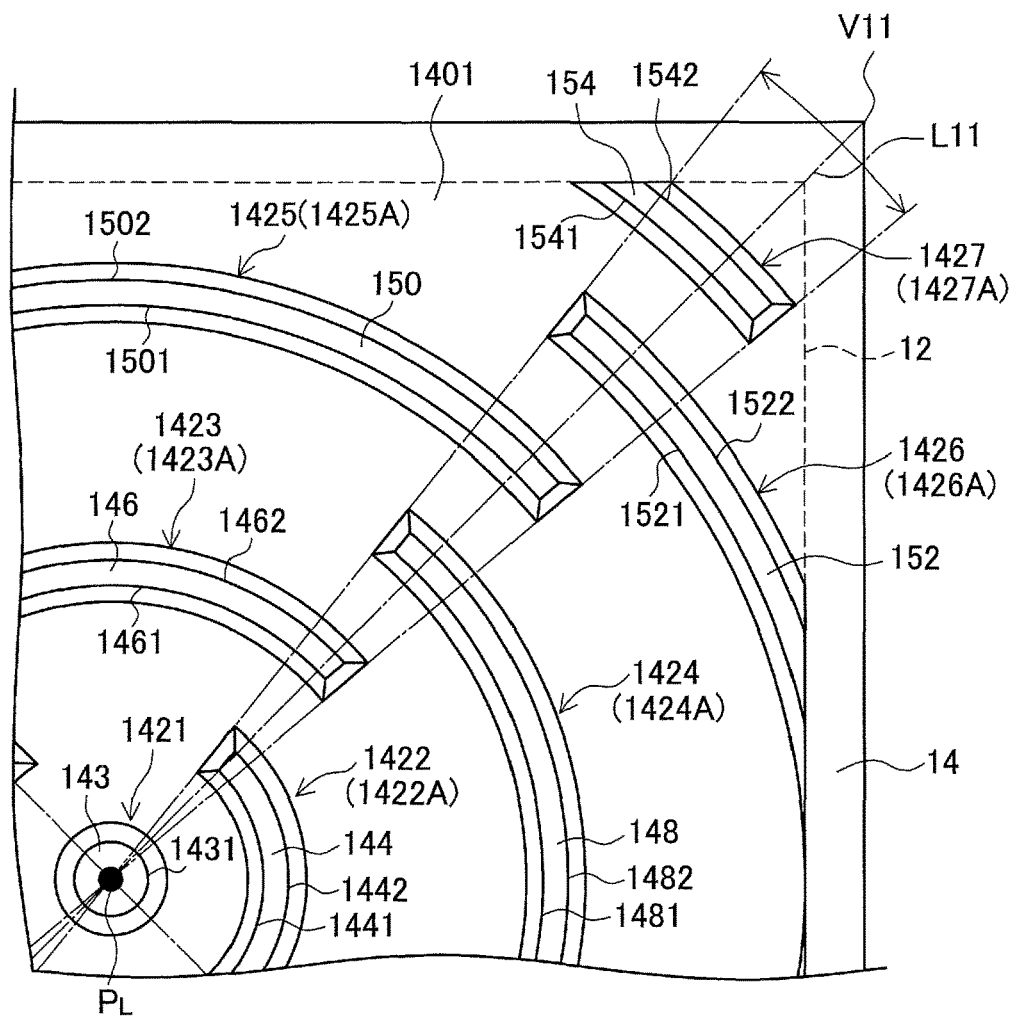
FIG. 17 is a plan view for describing circumferential lengths of protrusions.

Alternatively, as illustrated in FIG. 17, the circumferential length of the portions overlapping with each other may be larger for two adjacent protrusions far away from the load point $P_L$ than for two adjacent protrusions close to the load point $P_L$. In other words, in two protrusions adjacent to each other in the direction along which the virtual straight line L11 extends, edges of the end parts in the circumferential direction intersecting the virtual straight line L11 may extend in a direction passing through the load point $P_L$ and intersecting the virtual straight line L11. In this case, an angle φ formed by one edge and the other edge is set appropriately in accordance with surface rigidity against an assumed load applied to the load point $P_L$.

Although not shown, also as viewed from the direction along which the virtual straight line L12 extends, in two protrusions adjacent to each other in the direction, the circumferential length of portions that overlap with each other can be configured as illustrated in FIG. 17. Also as viewed from the direction along which the virtual straight line L13 extends, in two protrusions adjacent to each other in the direction, the circumferential length of portions that overlap with each other can be configured as illustrated in FIG. 17. Also as viewed from the direction along which the virtual straight line L14 extends, in two protrusions adjacent to each other in the direction, the circumferential length of portions that overlap with each other can be configured as illustrated in FIG. 17.

The panel 140 according to the eighth embodiment described above provides an effect similar to that of the panel 10 of the first embodiment.

«9. Ninth Embodiment»

Figure 18:
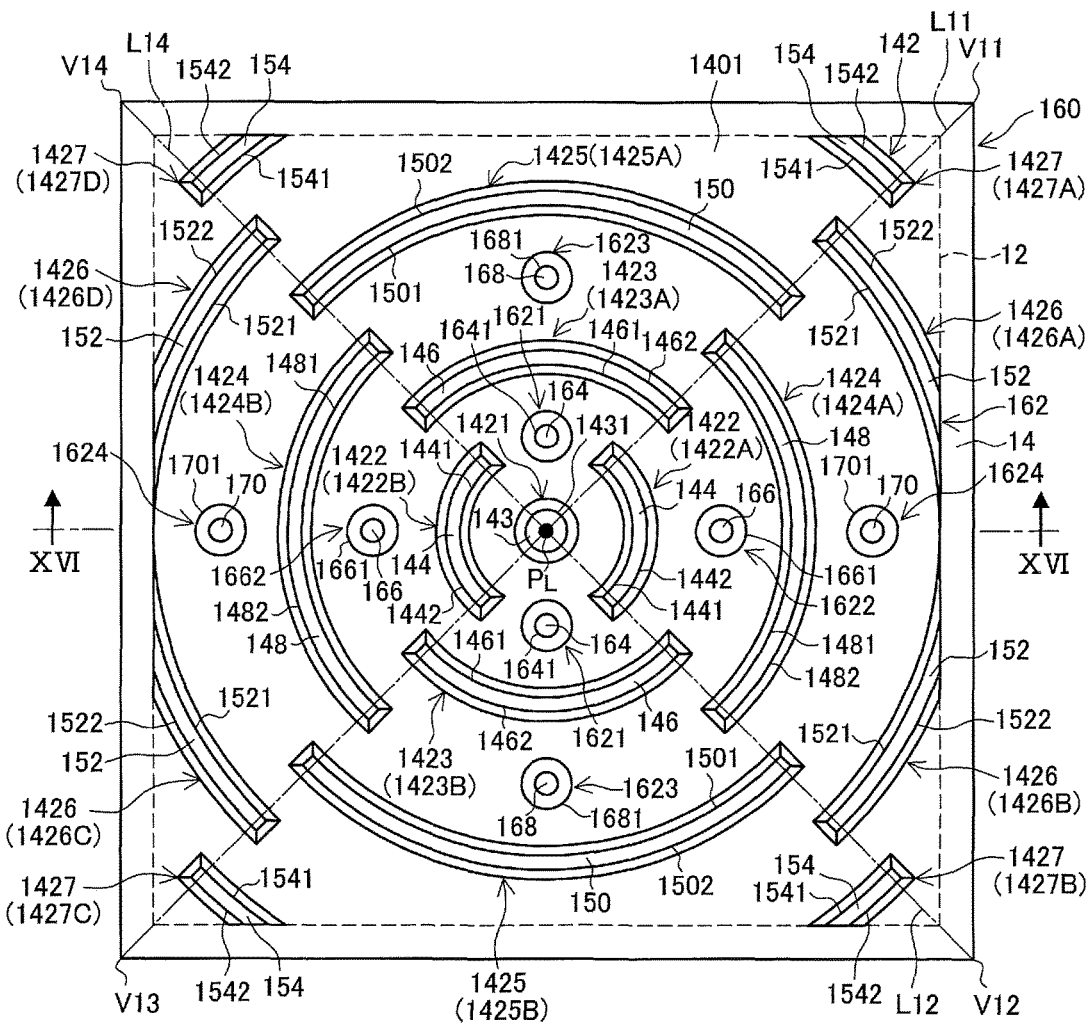
FIG. 18 is a plan view of a panel according to a ninth embodiment.
Figure 19:
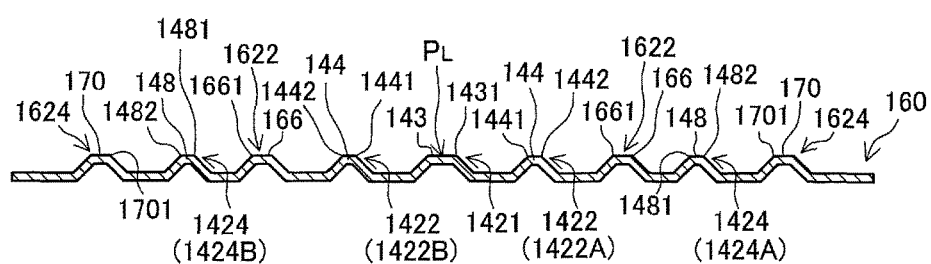
FIG. 19 is a XVI-XVI cross-sectional view of FIG. 17.

A panel 160 according to a ninth embodiment will be described with reference to FIGS. 18 and 19. FIG. 18 is a plan view of the panel 160. FIG. 19 is a XVI-XVI cross-sectional view of FIG. 18. The panel 160 according to the ninth embodiment differs from the panel 140 of the eighth embodiment in a configuration of a plurality of second protrusions 162. The configuration of the second protrusions 162 is mainly described below; description is given on differences from the protrusions 142 of the eighth embodiment. In the following description, in the clockwise direction, i.e., the right-handed direction, the starting point side is called one end in the circumferential direction, and the endpoint side is called the other end in the circumferential direction.

The panel 160 is obtained by adding, to the panel 140 of the eighth embodiment, a plurality (two in the present embodiment) of eighth protrusions 1621, a plurality (two in the present embodiment) of ninth protrusions 1622, a plurality (two in the present embodiment) of tenth protrusions 1623, and a plurality (two in the present embodiment) of eleventh protrusions 1624.

<9-1. Eighth Protrusion>

The eighth protrusions 1621 protrude from a surface 1601. The eighth protrusions 1621 each include a top face 164. The top face 164 has a circular shape in a planar view. The eighth protrusions 1621 each include a ridge line 1641. The ridge line 1641 has a circular shape in a planar view. Like the second protrusions 1422, the eighth protrusions 1621 are located on the first circle. The eighth protrusions 1621 are located between the two second protrusions 1422 adjacent to each other in the circumferential direction.

<9-2. Ninth Protrusion>

The ninth protrusions 1622 protrude from the surface 1601. The ninth protrusions 1622 each include a top face 166. The top face 166 has a circular shape in a planar view. The ninth protrusions 1622 each include a ridge line 1661. The ridge line 1661 has a circular shape in a planar view. Like the third protrusions 1423, the ninth protrusions 1622 are located on the second circle. The ninth protrusions 1622 are located between the two third protrusions 1423 adjacent to each other in the circumferential direction.

<9-3. Tenth Protrusion>

The tenth protrusions 1623 protrude from the surface 1601. The tenth protrusions 1623 each include a top face 168. The top face 168 has a circular shape in a planar view. The tenth protrusions 1623 each include a ridge line 1681. The ridge line 1681 has a circular shape in a planar view. Like the fourth protrusions 1424, the tenth protrusions 1623 are located on the third circle. The tenth protrusions 1623 are located between the two fourth protrusions 1424 adjacent to each other in the circumferential direction.

<9-4. Eleventh Protrusion>

The eleventh protrusions 1624 protrude from the surface 1601. The eleventh protrusions 1624 each include a top face 170. The top face 170 has a circular shape in a planar view. The eleventh protrusions 1624 each include a ridge line 1701. The ridge line 1701 has a circular shape in a planar view. Like the fifth protrusions 1425, the eleventh protrusions 1624 are located on the fourth circle. The eleventh protrusions 1624 are located between the two fifth protrusions 1425 adjacent to each other in the circumferential direction.

<9-5. Modes of Plurality of Protrusions>

In the panel 160 according to the present embodiment, modes of the first protrusion 1421 to the eleventh protrusions 1624 are set in consideration of surface rigidity against an assumed load applied to the load point $P_L$. That is, as in the panel 10 according to the first embodiment, the heights of the first protrusion 1421 to the eleventh protrusions 1624 and the inclination angles θ of the side faces forming the first protrusion 1421 to the eleventh protrusions 1624 can be set in accordance with the magnitude of the assumed load. In addition, as in the panel 10 according to the first embodiment, the widths of the top faces 143, 144, 146, 148, 150, 152, 154, 164, 166, 168, and 170 and the intervals between the first protrusion 1421 to the eleventh protrusions 1624 can be set in accordance with the magnitude of the assumed load. Thus, the panel 160 provided with appropriate surface rigidity in accordance with the assumed load can be produced with high yield.

The heights of the first protrusion 1421 to the eleventh protrusions 1624 may all be the same, or some or all may be different. The inclination angles θ of the side faces forming the first protrusion 1421 to the eleventh protrusions 1624 may all be the same, or some or all may be different. Also the widths of the top faces 143, 144, 146, 148, 150, 152, 154, 164, 166, 168, and 170 may all be the same, or some or all may be different. Also the intervals between the first protrusion 1421 to the eleventh protrusions 1624 may all be the same, or some or all may be different. The numbers of the second protrusions 1422 to the eleventh protrusions 1624 can also be set in accordance with the magnitude of the assumed load.

The panel 160 according to the ninth embodiment described above provides an effect similar to that of the panel 10 of the first embodiment.

《10. Tenth Embodiment 》

Figure 20:
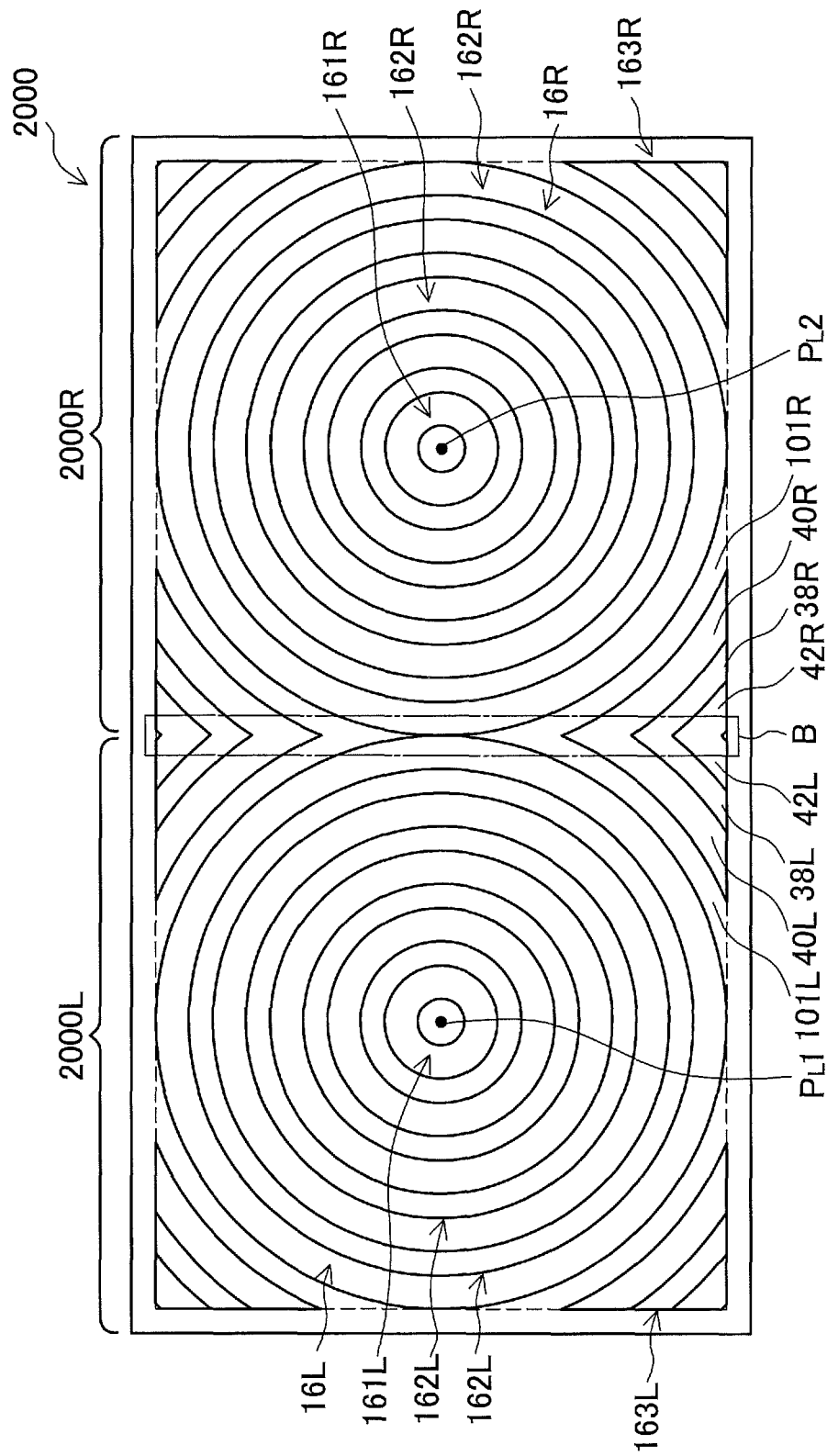
FIG. 20 is a plan view of a panel according to a tenth embodiment.

A panel 2000 according to a tenth embodiment will be described with reference to FIG. 20. FIG. 20 is a plan view of the panel 2000. The panel 2000 according to the tenth embodiment includes a plurality of load points $P_L1$ and $P_L2$. Provided around each of the load points $P_L1$ and $P_L2$ are protrusions intersecting, at a plurality of positions, each of a plurality of virtual straight lines extending radially from the corresponding load points $P_L1$ and $P_L2$. Hereinafter, description will be given using as an example the panel 2000 including, as the protrusions, the protrusions 16 formed on the panel 10 according to the first embodiment.

The panel 2000 according to the present embodiment has a rectangular shape in a planar view. The panel 2000 has the load point $P_L1$ at the center of a left-half region 2000L and the load point $P_L2$ at the center of a right-half region 2000R. The left-half region 2000L of the panel 2000 is provided with protrusions 16L formed around the load point $P_L1$. The protrusions 16L include a first protrusion 161L, second protrusions 162L, and third protrusions 163L.

The right-half region 2000R of the panel 2000 is provided with protrusions 16R formed around the load point $P_L2$. The protrusions 16R include a first protrusion 161R, second protrusions 162R, and third protrusions 163R. At a boundary portion B between the left-half region 2000L and the right-half region 2000R, top faces 38L and 38R, side faces 40L and 40R, and side faces 42L and 42R of the third protrusions 163L and 163R and the surfaces 101 on the left and right are continuous.

Figure 21:
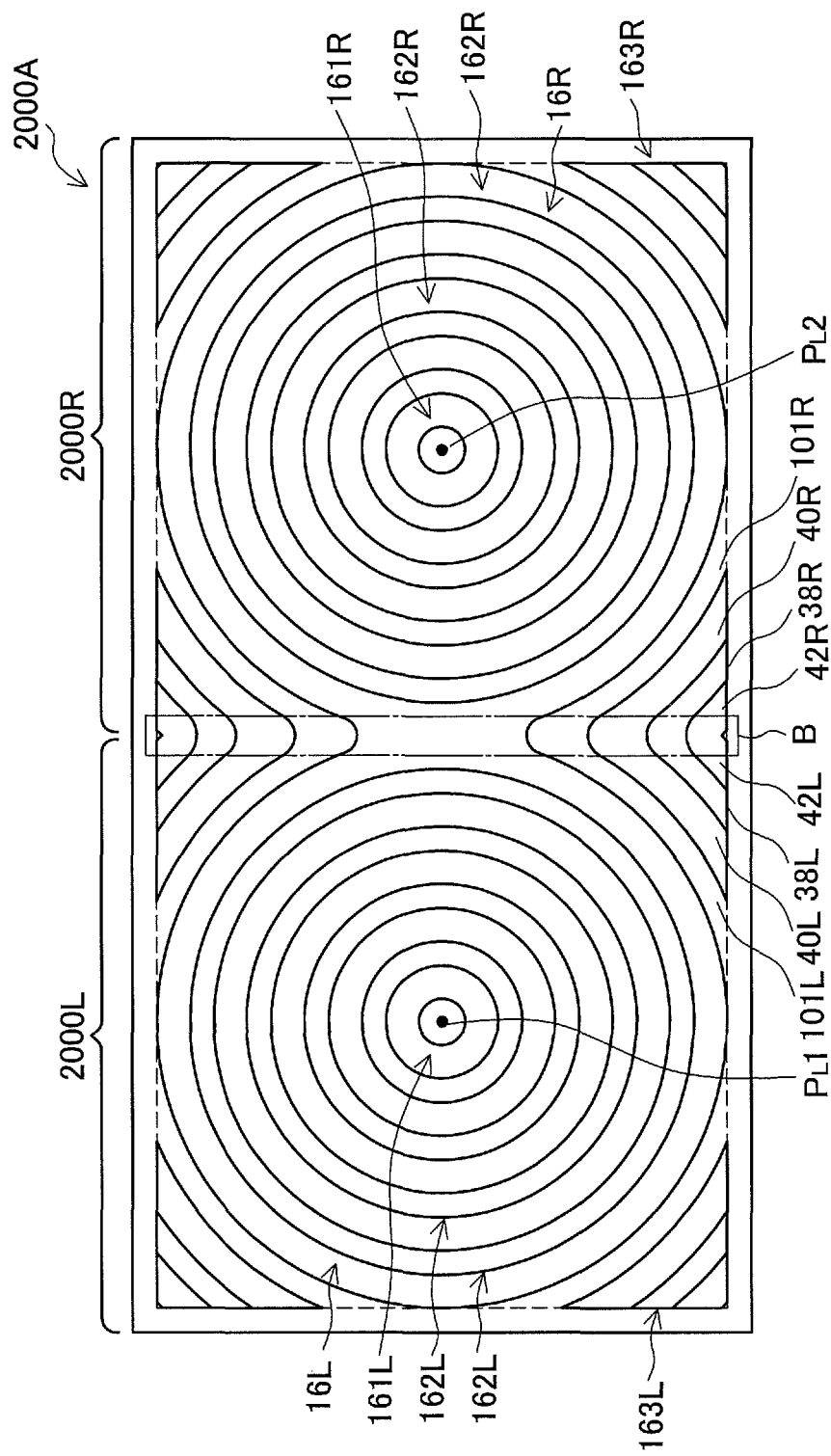
FIG. 21 is an explanatory diagram illustrating a modification of the tenth embodiment.

In the panel 2000 illustrated in FIG. 20, at the boundary portion B between the third protrusions 163L and 163R, a spot where the side faces 40L and 40R or the side faces 42L and 42R are connected is formed with an acute angle. In contrast, as illustrated in FIG. 21, a spot where the side faces 40L and 40R or the side faces 42L and 42R are connected may be provided with a curved surface to make the side faces 40L and 40R or the side faces 42L and 42R continuous via the curved surface. This configuration alleviates local stress concentration at the boundary portion B between the left-half region 2000L and the right-half region 2000R in a state where a load is applied to each of the load points $P_L1$ and $P_L2$.

In the panel 2000, modes of the protrusions 16L and 16R are set in consideration of surface rigidity against an assumed load applied to each of the load points $P_L1$ and $P_L2$. That is, as in the panel 10 according to the first embodiment, the heights of the protrusions 16L and 16R and the inclination angles θ of the side faces forming the protrusions 16L and 16R can be set in accordance with the magnitude of the assumed load. In addition, as in the panel 10 according to the first embodiment, the widths of the top faces of the protrusions 16L and 16R and the intervals between the protrusions 16L and 16R can be set in accordance with the magnitude of the assumed load. Thus, the panel 2000 provided with appropriate surface rigidity in accordance with the assumed load can be produced with high yield.

The heights of the protrusions 16L and 16R may all be the same, or some or all may be different. The inclination angles θ of the side faces forming the protrusions 16L and 16R may all be the same, or some or all may be different. Also the widths of the top faces of the protrusions 16L and 16R may all be the same, or some or all may be different. Also the intervals between the protrusions 16L and 16R may all be the same, or some or all may be different. The numbers of the second protrusions 162L and 162R and the third protrusions 163L and 163R can also be set in accordance with the magnitude of the assumed load.

The panel 2000 according to the tenth embodiment described above provides an effect similar to that of the panel 10 of the first embodiment even in the case where a load is applied to a plurality of positions of the panel 2000 from the outside. In particular, according to the panel 2000 of the present embodiment, surface rigidity can be improved appropriately against an assumed load applied to each of the load points $P_L1$ and $P_L2$.

The shapes of the protrusions 16L and 16R in the panel 2000 according to the present embodiment, specifically, the shapes of the protrusions 16L and 16R in a planar view, are not limited to circular shapes. Instead of the shapes of the protrusions 16 in the panel 10 of the first embodiment, the shapes of the protrusions in the panel of any of the second to ninth embodiments may be used. The shapes of the protrusions formed in the left-half region 2000L may be the same as or different from the shapes of the protrusions formed in the right-half region 2000R.

In addition, the protrusions 16L and 16R formed around the corresponding load points $P_L1$ and $P_L2$ have the same cross-sectional shapes, density, and formation range in the panel 2000 according to the present embodiment, but the cross-sectional shapes, density, and formation range may be changed between the protrusions 16L and 16R in accordance with an assumed load applied to each of the load points $P_L1$ and $P_L2$. Hereinafter, in eleventh to twelfth embodiments, description will be given on modifications in which protrusions formed in left and right regions have different formation ranges and densities.

« 11. Eleventh Embodiment »

Figure 22:
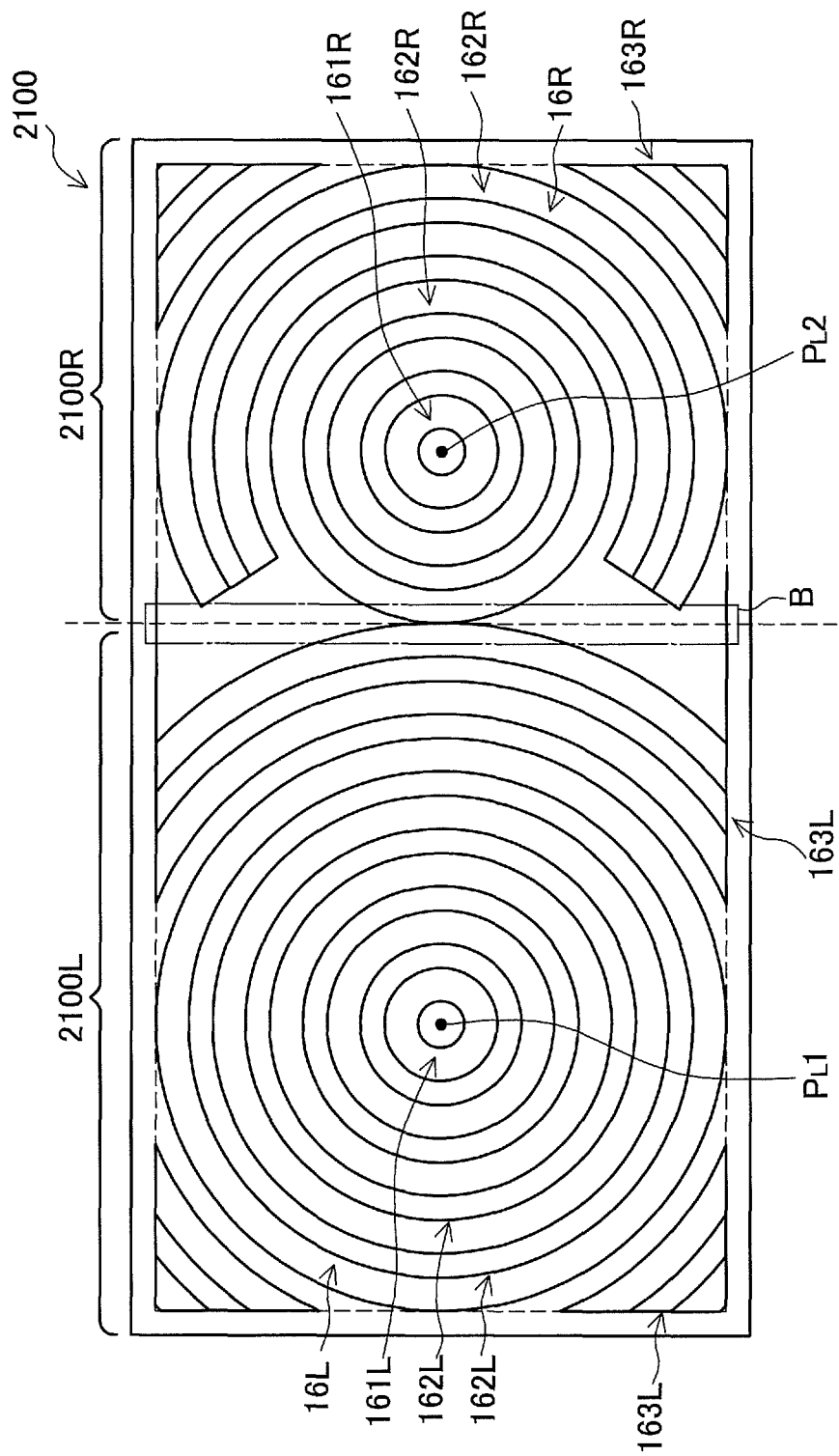
FIG. 22 is a plan view of a panel according to an eleventh embodiment.

A panel 2100 according to an eleventh embodiment will be described with reference to FIG. 22. FIG. 22 is a plan view of the panel 2100. In the panel 2100 according to the eleventh embodiment, the ranges of left and right regions 2100L and 2100R, that is, the formation ranges of the protrusions 16L and 16R, are different. Description is given below on differences from the panel 2000 of the tenth embodiment.

The panel 2100 according to the present embodiment is an example of a panel in which an assumed load applied to the load point $P_L1$ is larger than an assumed load applied to the load point $P_L2$. In this panel 2100, the formation range of the protrusions 16L formed around the load point $P_L1$ is made larger than the formation range of the protrusions 16R formed around the load point $P_L2$ so that surface rigidity against a load applied to the load point $P_L1$ is relatively large. At a boundary portion B between the left-half region 2100L provided with the protrusions 16L and the right-half region 2100R provided with the protrusions 16R, end parts of the second protrusion 162R of the protrusions 16R are formed so as to prevent interference between the protrusions 16L and 16R.

In the panel 2100 according to the eleventh embodiment, the formation ranges of the protrusions 16L and 16R are set in consideration of surface rigidity against an assumed load applied to each of the load points $P_L1$ and $P_L2$, and the formation range of the protrusions 16L formed around the load point $P_L1$ with a larger assumed load is made larger. In this manner, surface rigidity centered at the load point PO can be improved relatively, and thus surface rigidity can be improved appropriately against an assumed load applied to each of the load points $P_L1$ and $P_L2$.

Figure 23:
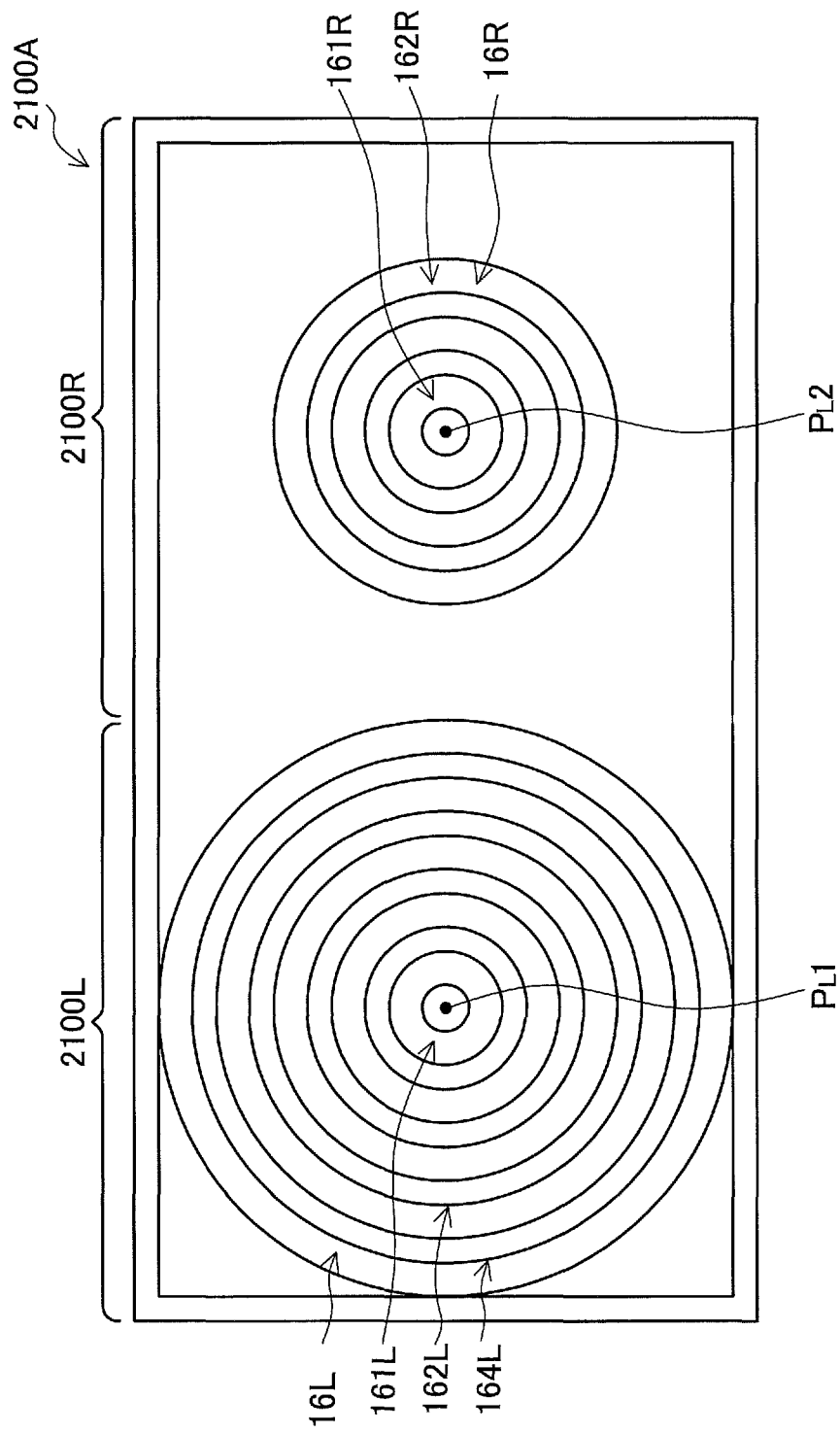
FIG. 23 is an explanatory diagram illustrating a modification of the eleventh embodiment.

In the panel 2100 illustrated in FIG. 22, in forming the protrusions 16L and 16R on the front face of the panel 2100, the formation ranges of the protrusions 16L and 16R are set in accordance with an assumed load applied to each of the load points $P_L1$ and $P_L2$. In contrast, as illustrated in FIG. 23, within the ranges of the left-half region 2100L including the load point $P_L1$ and the right-half region 2100B including the load point $P_L2$, the formation ranges of the protrusions 16L and 16R may be changed in accordance with assumed loads.

The shapes of the protrusions 16L and 16R in the panel 2100 according to the present embodiment, specifically, the shapes of the protrusions 16L and 16R in a planar view, are not limited to circular shapes. Instead of the shapes of the protrusions 16 in the panel 10 of the first embodiment, the shapes of the protrusions in the panel of any of the second to ninth embodiments may be used. The shapes of the protrusions formed in the left-half region 2100L may be the same as or different from the shapes of the protrusions formed in the right-half region 2100R.

« 12. Twelfth Embodiment »

Figure 24:
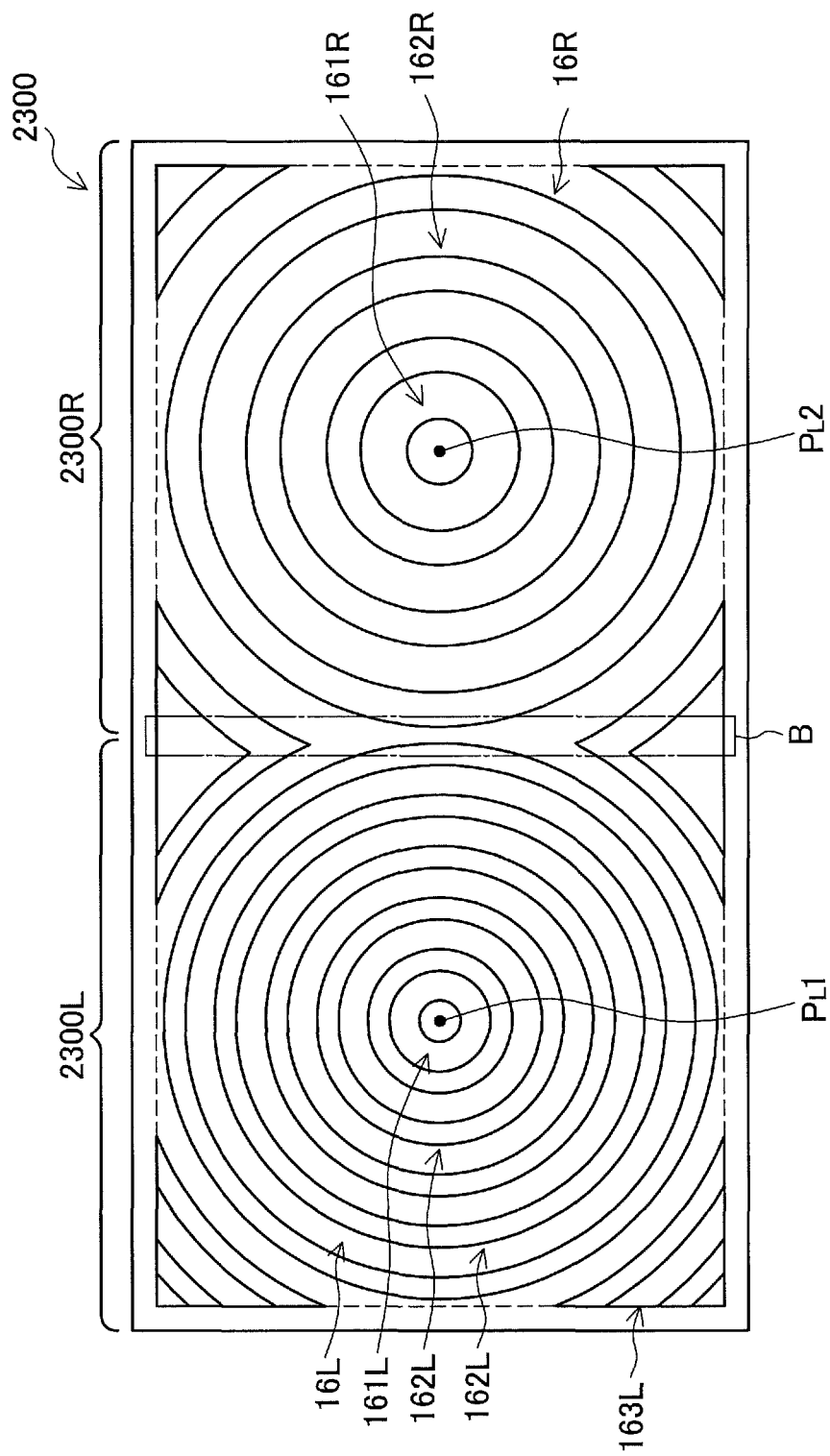
FIG. 24 is a plan view of a panel according to a twelfth embodiment.

A panel 2300 according to a twelfth embodiment will be described with reference to FIG. 24. FIG. 24 is a plan view of the panel 2300. In the panel 2300 according to the twelfth embodiment, the protrusions 16L and 16R formed in left and right regions 2300L and 2300R, respectively, have different densities. Description is given below on differences from the panel 2000 of the twelfth embodiment.

The panel 2300 according to the present embodiment is an example of a panel in which an assumed load applied to the load point $P_L1$ is larger than an assumed load applied to the load point $P_L2$. In this panel 2100, the density of the protrusions 16L formed around the load point $P_L1$ is made higher than the density of the protrusions 16R formed around the load point $P_L2$ so that surface rigidity against a load applied to the load point $P_L1$ is relatively large. At a boundary portion B between the left-half region 2300L provided with the protrusions 16L and the right-half region 2300R provided with the protrusions 16R, the position of the boundary portion B is set such that the top faces 38L and 38R, side faces 40L and 40R, and side faces 42L and 42R of the third protrusions 163L and 163R and the surfaces 101 on the left and right are continuous.

In the panel 2300 according to the twelfth embodiment, the densities of the protrusions 16L and 16R are set in consideration of surface rigidity against an assumed load applied to each of the load points $P_L1$ and $P_L2$, and the density of the protrusions 16L formed around the load point $P_L1$ with a larger assumed load is made higher. In this manner, surface rigidity centered at the load point $P_L1$ can be improved relatively, and thus surface rigidity can be improved appropriately against an assumed load applied to each of the load points $P_L1$ and $P_L2$.

The shapes of the protrusions 16L and 16R in the panel 2300 according to the present embodiment, specifically, the shapes of the protrusions 16L and 16R in a planar view, are not limited to circular shapes. Instead of the shapes of the protrusions 16 in the panel 10 of the first embodiment, the shapes of the protrusions in the panel of any of the second to ninth embodiments may be used. The shapes of the protrusions formed in the left-half region 2300L may be the same as or different from the shapes of the protrusions formed in the right-half region 2300R. In addition to the densities of the protrusions 16L and 16R, the formation ranges of the protrusions 16L and 16R may be set in accordance with assumed loads.

EXAMPLES

<Evaluation 1>

Surface rigidity was evaluated, by FEM analysis, for each of the panels 10, 50, 70, 90, 100, 110, 120, 140, and 160 according to the first to ninth embodiments (Examples 1 to 9). For comparison, surface rigidity was evaluated by FEM analysis also for a panel 180 illustrated in FIG. 25 (Comparative Example 1) and a panel 190 illustrated in FIG. 26 (Comparative Example 2).

(Conditions for FEM Analysis)

For the FEM analysis, a commercially available general-use program code, LS-DYNA ver. 971 rev 6.1.1 was used. Calculation was performed by a static implicit method. A 285-mm-square square-shaped sheet material with a 15-mm flange was used as each panel. The flange was formed by perpendicularly bending an end edge part of the panel. The material of each panel was a steel material (Young's modulus: 206.5 GPa, Poisson's ratio: 0.3, density: 7.85 g/cm3). Sheet thickness was 0.6 mm. Displacement when a load (1ON) was applied to the center of the panel with the four corners of the panel and the center of each side of the panel restrained was calculated. The range of load application had a square shape. The length of each side of the range of load application (square shape) was of four types, 20 mm, 50 mm, 100 mm, and 150 mm.

In the panels according to Examples 1 to 9, the widths of the top faces of the protrusions were 2 mm, the inclination angles θ of the side faces of the protrusions with respect to the surface of the panel were 45 degrees, the interval between two protrusions adjacent to each other in a direction from the range of load application (load point) toward the outer side (the interval between the top face of one protrusion and the top face of the other protrusion) was 10 mm, and the depth of protrusions and recesses was 3 mm. For Example 1, the diameter of the top face of the protrusion located on the load point $P_L$ was set to 3 mm. For Examples 2, 3, and 4, the length of one side of the top face of the protrusion located on the load point $P_L$ was set to 6 mm. For Examples 8 and 9, the angle φ shown in FIG. 17 was set to 30 degrees.

(Panel of Comparative Example 1)

Figure 25:
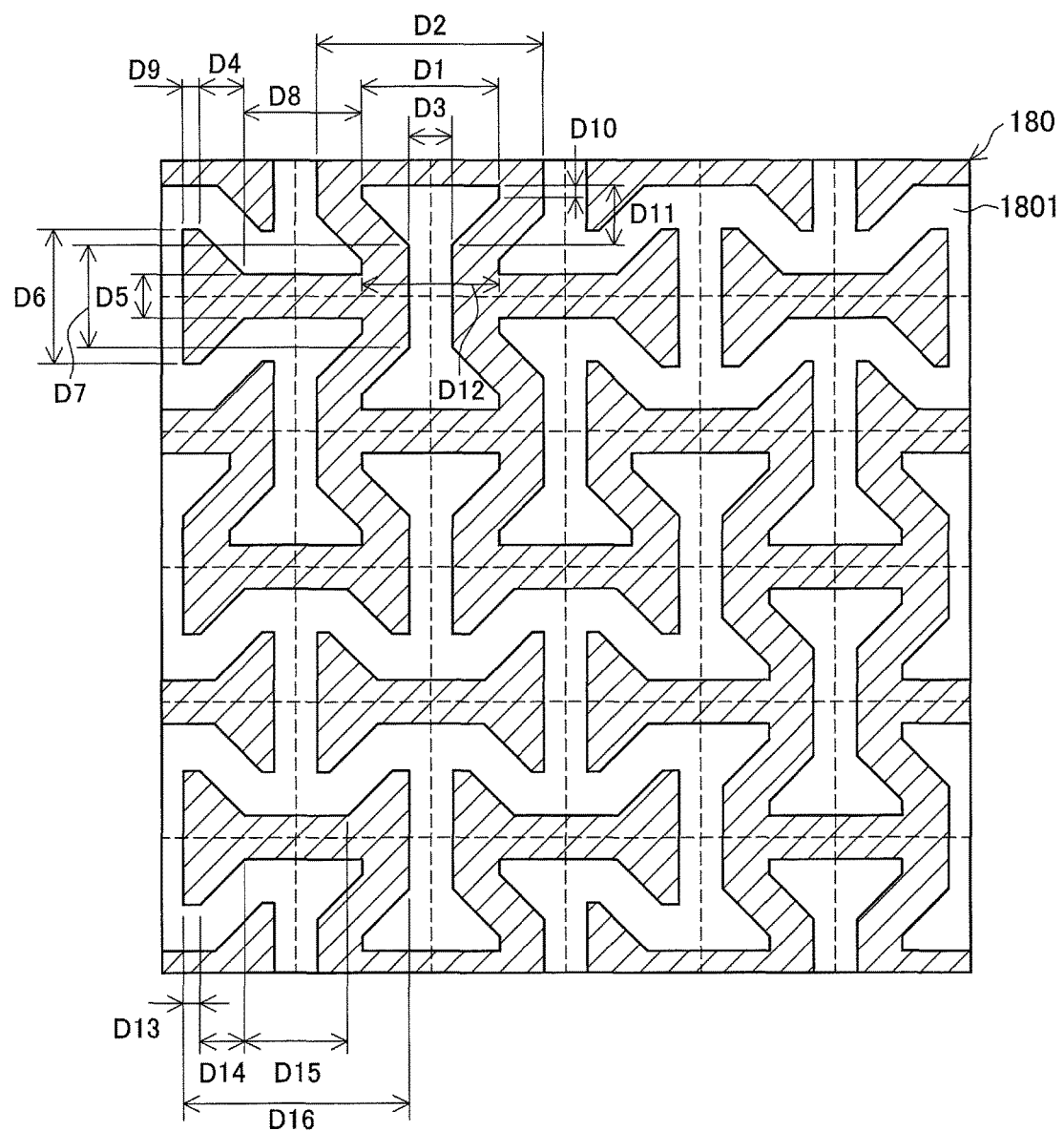
FIG. 25 is a conceptual diagram illustrating a protrusion of a panel according to Comparative Example 1.

The panel 180 according to Comparative Example 1 has a protrusion 182, as illustrated in FIG. 25. Here, FIG. 25 is an explanatory diagram illustrating the shape of a top face of the protrusion 182. In practice, an inclined surface is formed at an edge portion of the protrusion 182. For easy understanding, the protrusion 182 is hatched in FIG. 25. An inclination angle of the inclined surface with respect to a surface 1801 of the panel 180 was 45 degrees. The protrusion height of the protrusion 182 from the surface 1801 (the depth of protrusions and recesses of the panel 180) was 3 mm.

In the protrusion 182, a dimension D1 was 24 mm. A dimension D2 was 40 mm. A dimension D3 was 8 mm. A dimension D4 was 8 mm. A dimension D5 was 8 mm. A dimension D6 was 24 mm. A dimension D7 was 20 mm. A dimension D8 was 24 mm. A dimension D9 was 3 mm. A dimension D10 was 3 mm. A dimension D11 was 15 mm. A dimension D12 was 24 mm. A dimension D13 was 3 mm. A dimension D14 was 8 mm. A dimension D15 was 24 mm. A dimension D16 was 40 mm.

(Panel of Comparative Example 2)

Figure 26:
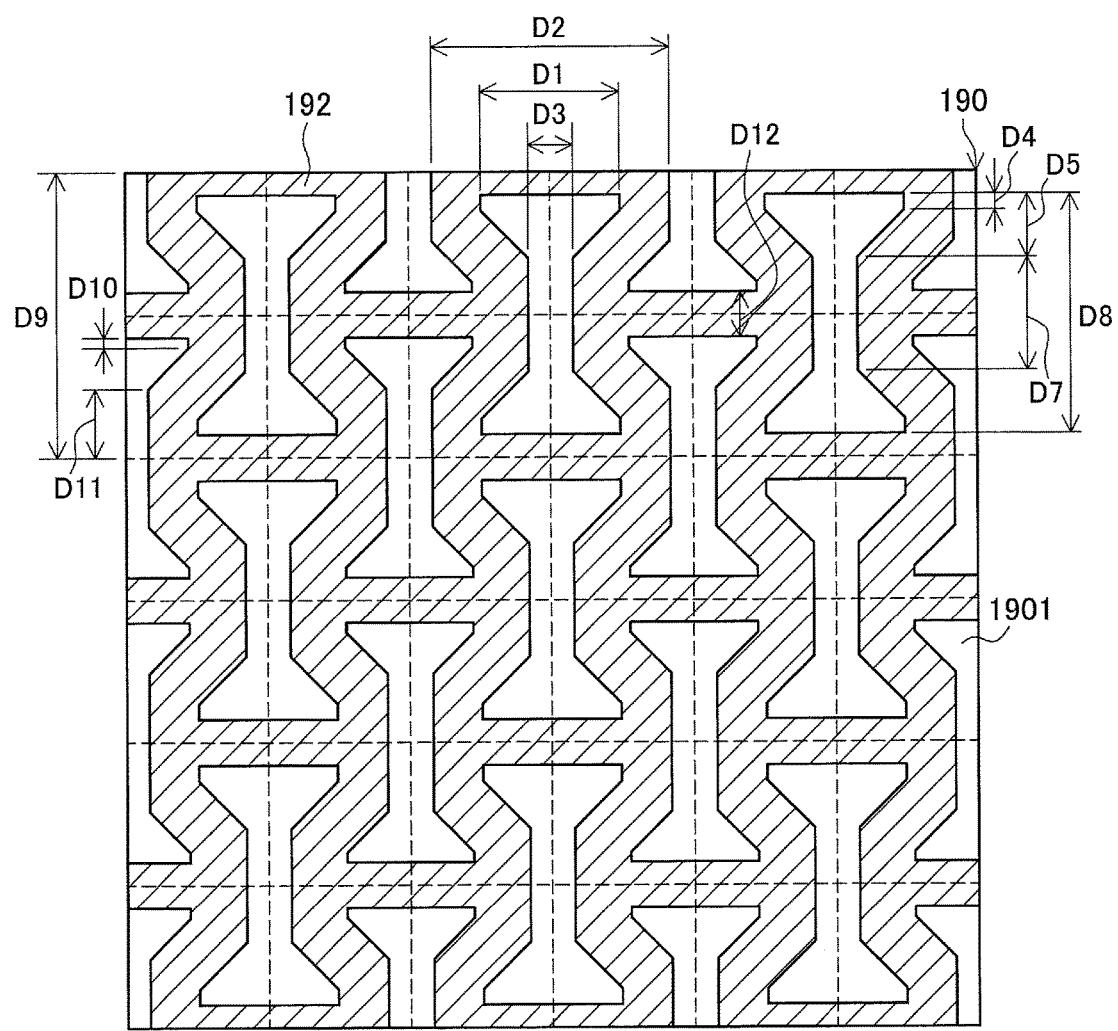
FIG. 26 is a conceptual diagram illustrating a protrusion of a panel according to Comparative Example 2.

The panel 190 according to Comparative Example 2 has a protrusion 192, as illustrated in FIG. 26. Here, FIG. 26 is an explanatory diagram illustrating the shape of a top face of the protrusion 192. In practice, an inclined surface is formed at an edge portion of the protrusion 192. For easy understanding, the protrusion 192 is hatched in FIG. 26. An inclination angle of the inclined surface with respect to a surface 1901 of the panel 190 was 45 degrees. The protrusion height of the protrusion 192 from the surface 1901 (the depth of protrusions and recesses of the panel 190) was 3 mm.

In the protrusion 192, a dimension D1 was 24 mm. A dimension D2 was 40 mm. A dimension D3 was 8 mm. A dimension D4 was 3 mm. A dimension D5 was 11 mm. A dimension D6 was 24 mm. A dimension D7 was 18 mm. A dimension D8 was 40 mm. A dimension D9 was 48 mm. A dimension D10 was 3 mm. A dimension D11 was 18 mm. A dimension D12 was 12 mm.

(Analysis Results)

Figure 27:
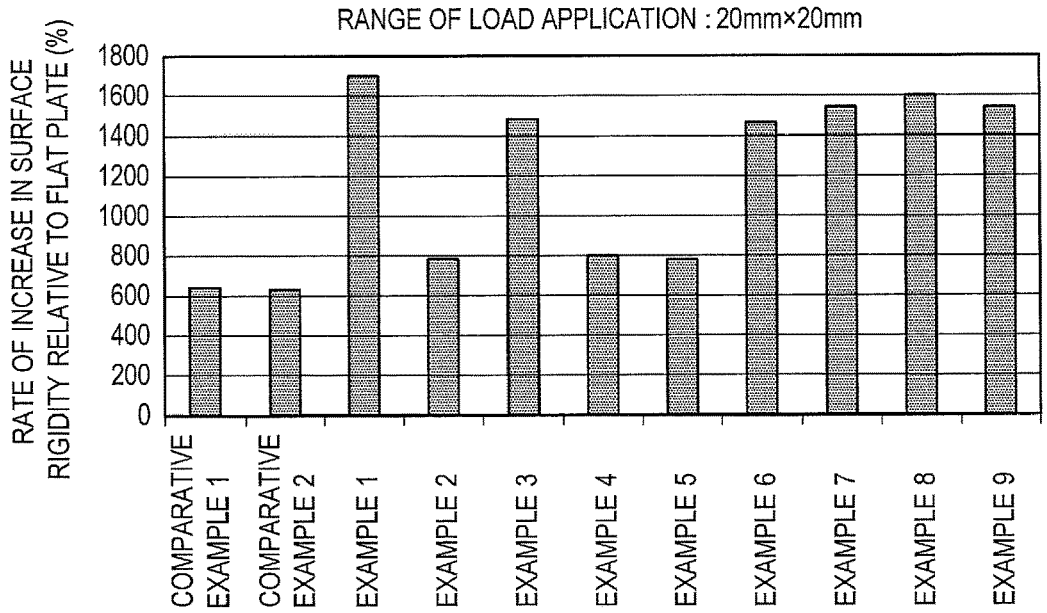
FIG. 27 is a graph showing results of FEM analysis of surface rigidity for Comparative Examples 1 and 2 and Examples 1 to 9, and shows the results when a range of load application has a 20-mm-square square shape.
Figure 28:
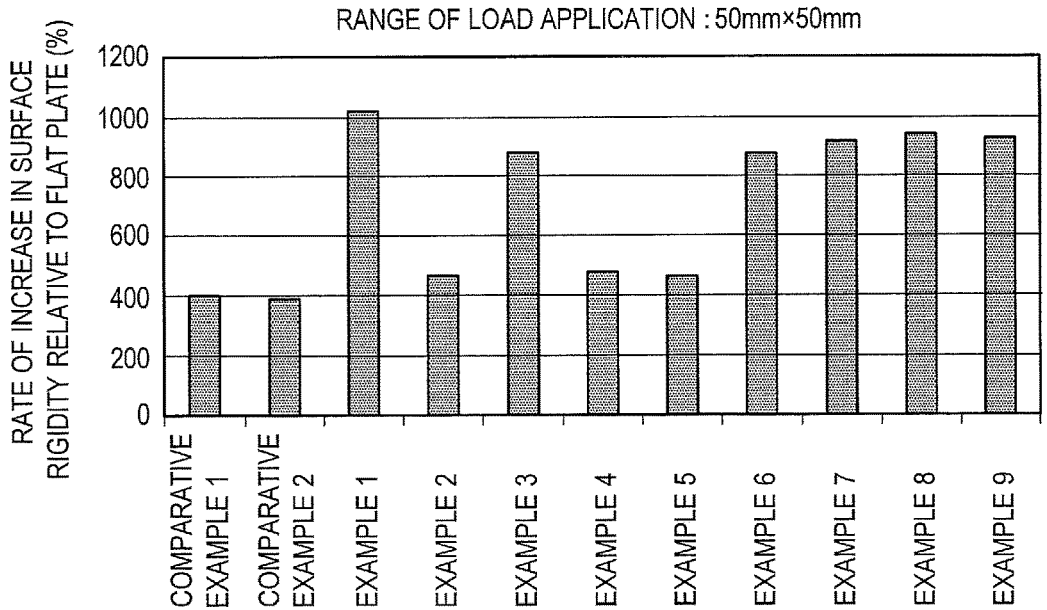
FIG. 28 is a graph showing results of FEM analysis of surface rigidity for Comparative Examples 1 and 2 and Examples 1 to 9, and shows the results when a range of load application has a 50-mm-square square shape.
Figure 29:
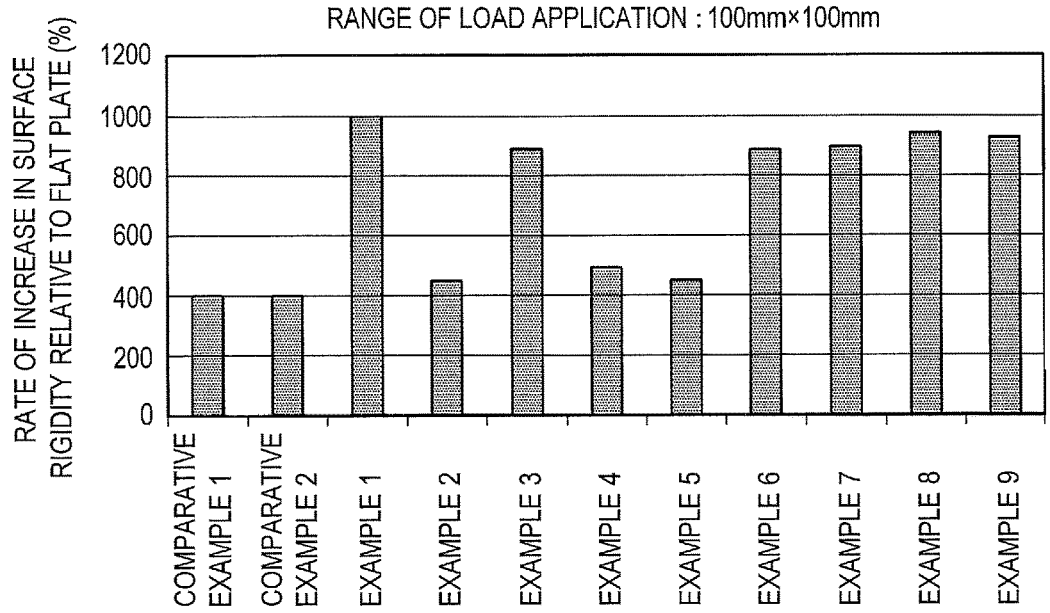
FIG. 29 is a graph showing results of FEM analysis of surface rigidity for Comparative Examples 1 and 2 and Examples 1 to 9, and shows the results when a range of load application has a 100-mm-square square shape.
Figure 30:
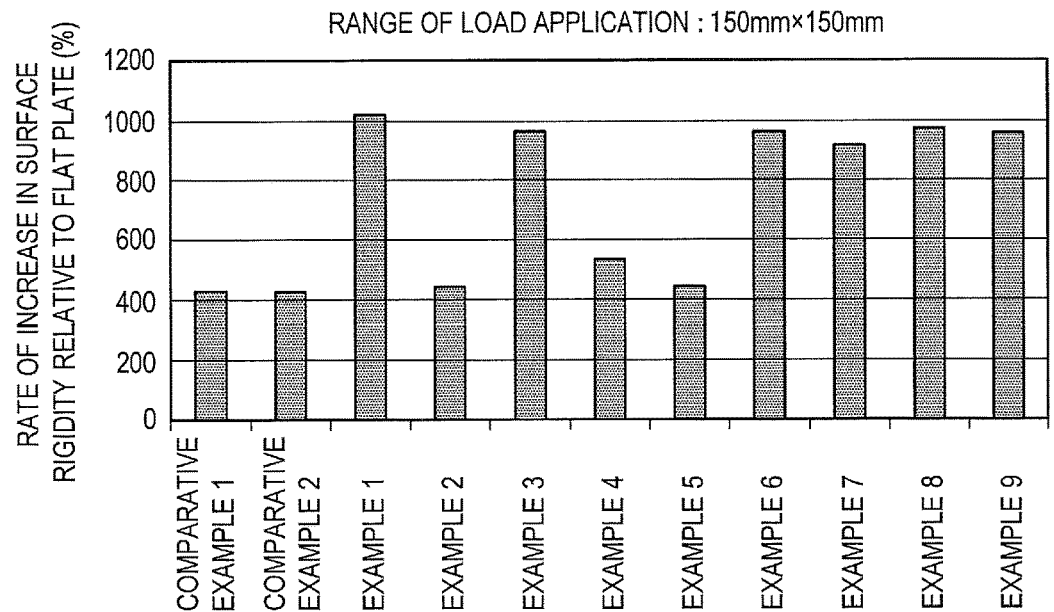
FIG. 30 is a graph showing results of FEM analysis of surface rigidity for Comparative Examples 1 and 2 and Examples 1 to 9, and shows the results when a range of load application has a 150-mm-square square shape.

FIGS. 27 to 30 show the analysis results. FIG. 27 is a graph showing the results when the range of load application had a 20-mm-square square shape. FIG. 28 is a graph showing the results when the range of load application had a 50-mm-square square shape. FIG. 29 is a graph showing the results when the range of load application had a 100-mm-square square shape. FIG. 30 is a graph showing the results when the range of load application had a 150-mm-square square shape.

In FIGS. 27 to 30, the vertical axis indicates the rate of increase in surface rigidity relative to a flat plate. The rate of increase was determined in the following manner. First, displacement when a load was applied to the flat plate was calculated in the manner as described above. Then, the displacement when a load was applied to the flat plate was divided by displacement when a load was applied to the panel with a protrusion; thus, the rate of increase was determined.

As shown in FIGS. 27 to 30, Examples 1 to 9 exhibited improved surface rigidity as compared with Comparative Examples 1 and 2. Examples 1, 3, and 6 to 9 exhibited improved surface rigidity as compared with Examples 2, 4, and 5. A larger number of ridge lines that perpendicularly intersect the virtual straight lines extending radially from the load point $P_L$ resulted in more improved surface rigidity. Surface rigidity was improved when there existed a ridge line that perpendicularly intersects a straight line connecting the load point $P_L$ and a vertex of the panel.

<Evaluation 2>

For the panel according to Example 8, surface rigidity in the cases of different angles φ shown in FIG. 17 was evaluated by FEM analysis. Specifically, the angles φ of 5 degrees, 10 degrees, 20 degrees, 30 degrees, and 40 degrees were assumed. For comparison, surface rigidity was evaluated by FEM analysis also for the panel according to Example 1 and the panel according to Comparative Example 1. Here, the panel according to Example 1 corresponds to the case of the angle φ being 90 degrees. Analysis conditions were the same as those for Evaluation 1.

(Analysis Results)

Figure 31:
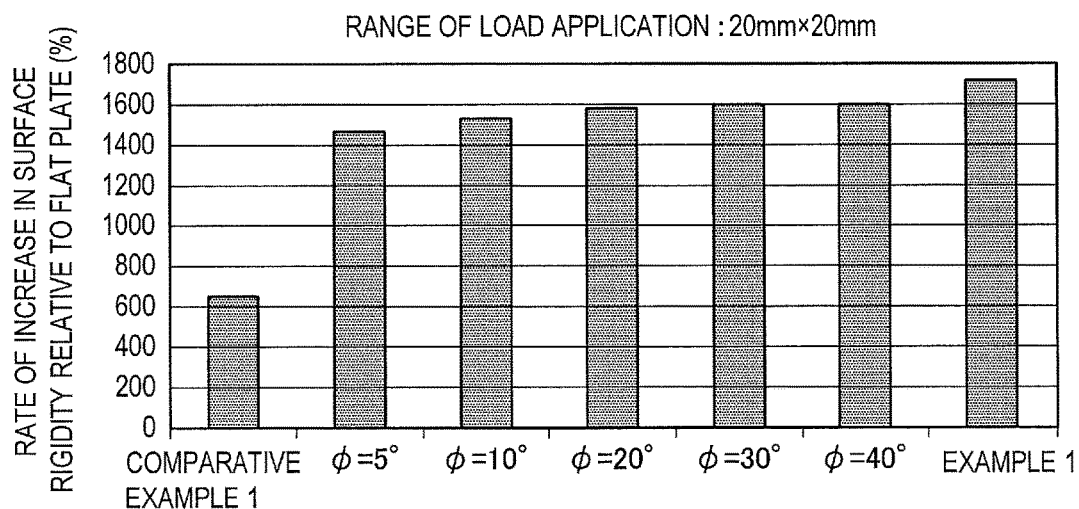
FIG. 31 is a graph showing results of FEM analysis of surface rigidity for Comparative Example 1, Example 1, and Example 8, and shows the results when a range of load application has a 20-mm-square square shape.
Figure 32:
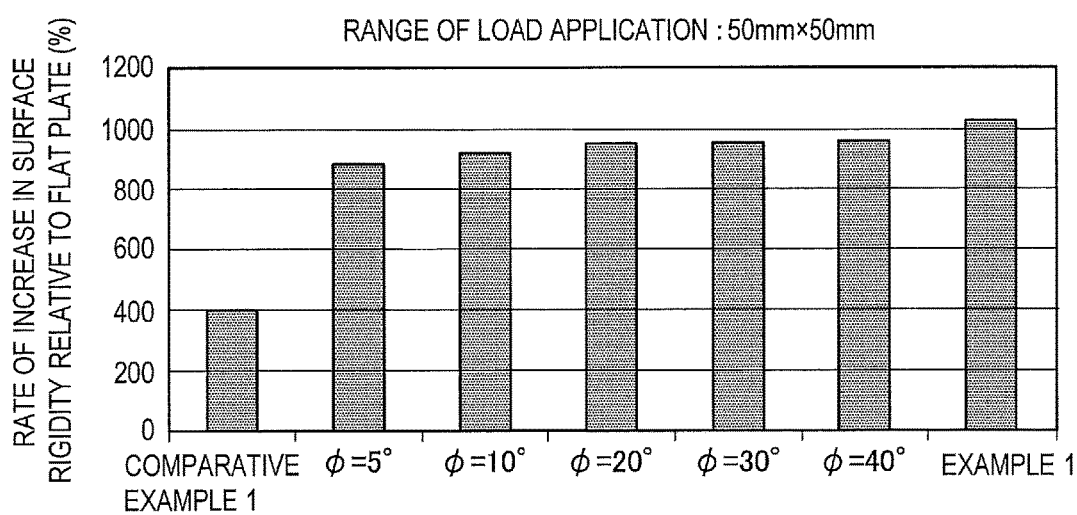
FIG. 32 is a graph showing results of FEM analysis of surface rigidity for Comparative Example 1, Example 1, and Example 8, and shows the results when a range of load application has a 50-mm-square square shape.
Figure 33:
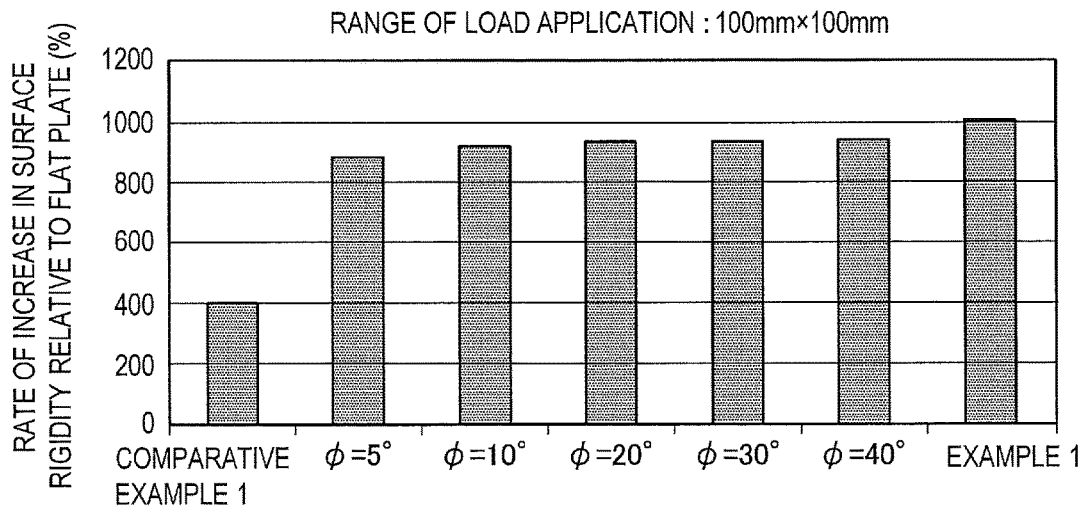
FIG. 33 is a graph showing results of FEM analysis of surface rigidity for Comparative Example 1, Example 1, and Example 8, and shows the results when a range of load application has a 100-mm-square square shape.
Figure 34:
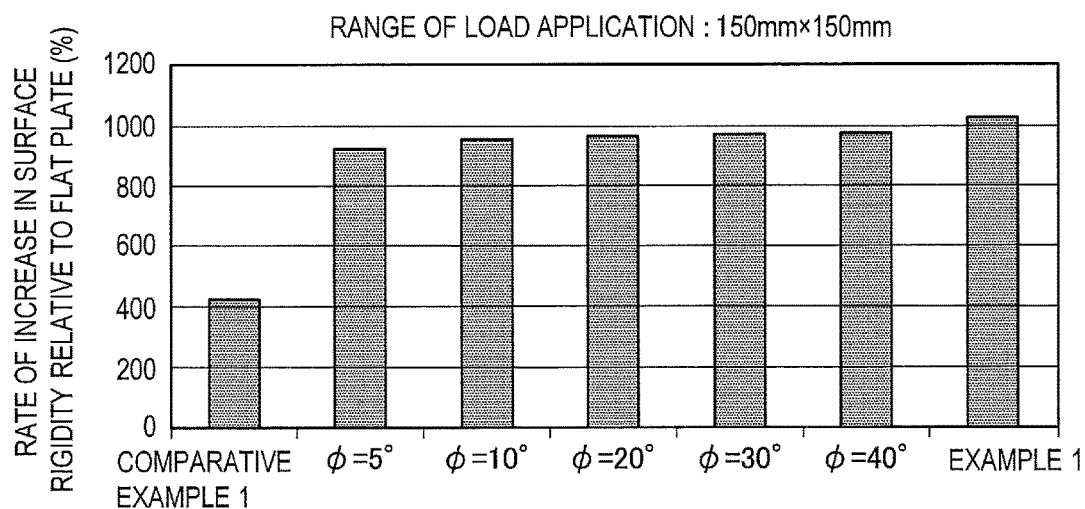
FIG. 34 is a graph showing results of FEM analysis of surface rigidity for Comparative Example 1, Example 1, and Example 8, and shows the results when a range of load application has a 150-mm-square square shape.

FIGS. 31 to 34 show the analysis results. FIG. 31 is a graph showing the results when the range of load application had a 20-mm-square square shape. FIG. 32 is a graph showing the results when the range of load application had a 50-mm-square square shape. FIG. 33 is a graph showing the results when the range of load application had a 100-mm-square square shape. FIG. 34 is a graph showing the results when the range of load application had a 150-mm-square square shape.

As shown in FIGS. 31 to 34, larger angles φ resulted in more improved surface rigidity.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

For example, the panel need not have a peripheral edge for attaching the panel to another member, around a region where the protrusions are formed (the reinforced section in the above embodiments). The region where the protrusions are formed (the reinforced section in the above embodiments) may be formed on a flat surface, or may be formed on a curved surface. A portion where a ridge line is formed may be subjected to filleting.

The above embodiments illustrate modes in which a plurality of protrusions are arranged at regular intervals in a predetermined cross section passing through the load point $P_L$. In order for a load to be received uniformly, it is preferable to arrange a plurality of protrusions at regular intervals in a predetermined cross section passing through the load point $P_L$ as in these embodiments. However, the intervals between the protrusions may differ entirely or partially in the panel as long as characteristics required of the panel are allowed. For convenience in design, etc., there may be a portion where the protrusions are not provided. For example, the protrusions may be partially chipped as long as characteristics required of the panel are allowed.

REFERENCE SIGNS LIST 10 panel
12 reinforced section
14 peripheral edge
16 protrusion
18, 26, 32, 38 top face
20, 28, 30, 34, 36, 40, 42 side face
22 first ring-shaped protrusion
161 second ring-shaped protrusion
161 first protrusion
162 second protrusion
163 third protrusion
181, 261, 262, 321, 322, 381, 382 ridge line
L11, L12, L13, L14 virtual straight line
$P_L$ load point

The invention claimed is:

1. A floor panel of an automobile comprising:
    a load point to which a load is applied from the outside; and
    a plurality of protrusions that protrude from a surface of the floor panel and are formed continuously or discontinuously around the load point, each of the plurality of protrusions having a ridge line corresponding to thereto,
    wherein all of the protrusions formed on the floor panel intersect, at a plurality of positions, each of a plurality of virtual straight lines extending radially from the load point to a respective vertex of the floor panel,
    wherein each of the ridge lines perpendicularly intersect all of the plurality of the virtual straight lines.

2. The panel according to claim 1,
    wherein the load point is a junction with another member.

3. The panel according to claim 1,
    wherein the protrusion includes a top face parallel to the surface of the panel.

4. The panel according to claim 1,
    wherein the panel is made of a steel sheet.

* * * * *